US012676696B2

(12) United States Patent
Zhang

(10) Patent No.: US 12,676,696 B2
(45) Date of Patent: Jul. 7, 2026

(54) DECODING METHOD AND APPARATUS

(71) Applicant: HUAWEI TECHNOLOGIES CO., LTD., Shenzhen (CN)

(72) Inventor: Chengmin Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 344 days.

(21) Appl. No.: 18/424,339

(22) Filed: Jan. 26, 2024

(65) Prior Publication Data

US 2024/0171304 A1     May 23, 2024

Related U.S. Application Data

(63) Continuation of application No. PCT/CN2021/109382, filed on Jul. 29, 2021.

(51) Int. Cl.
H04L 1/00          (2006.01)

(52) U.S. Cl.
CPC .......... H04L 1/0036 (2013.01); H04L 1/0015 (2013.01)

(58) Field of Classification Search
None
See application file for complete search history.

(56) References Cited

U.S. PATENT DOCUMENTS 4,397,022 A      8/1983  Weng et al.
2016/0373767 A1*  12/2016  Yang .................... H04N 19/146

2021/0058634 A1*  2/2021  Li ........................... H04N 19/44
2021/0329302 A1*  10/2021  Sun ......................... H04N 19/42
2024/0244189 A1*  7/2024  Hendry .................. H04N 19/70

FOREIGN PATENT DOCUMENTS

CN      101547010 A      9/2009
EP      2365657 A1      9/2011

OTHER PUBLICATIONS

"IEEE Standard for Ethernet," IEEE Std 802.3-2018, IEEE Computer Society, Total 5600 pages (Jun. 2018).

* cited by examiner

*Primary Examiner* — Abdelillah Elmejjarmi
(74) *Attorney, Agent, or Firm* — Leydig, Voit & Mayer, Ltd.

(57)          ABSTRACT

A decoding method and an apparatus are provided. A decoder includes a type detection module, a decoding and prediction module, a state determining module, and an output processing module. The type detection module is configured to detect a type of a to-be-decoded code block. The decoding and prediction module is configured to decode the to-be-decoded code block, and obtain a predicted decoding mode of the to-be-decoded code block. The state determining module is configured to select a decoding mode from the predicted decoding mode of the to-be-decoded code block. The output processing module is configured to update a decoding result based on the decoding mode selected by the state determining module. The decoder further includes a delay device, configured to delay outputting received data by at least one clock cycle.

20 Claims, 12 Drawing Sheets

| Input data (Input Data) | Encoded data (tx_coded) | | | | | | | | | |
| --- | --- | --- | --- | --- | --- | --- | --- | --- | --- | --- |
| | Sync header | Block payload (Block Payload) | | | | | | | | |
| 0                63 | 0  1 | 2 | | | | | | | | 65 |
| Data block format | | | | | | | | | | |
| $D_0D_1D_2D_3/D_4D_5D_6D_7$ | 01 | $D_0$ | $D_1$ | $D_2$ | $D_3$ | $D_4$ | $D_5$ | $D_6$ | $D_7$ | |
| Control block format | | Block type | | | | | | | | |
| $C_0C_1C_2C_3/C_4C_5C_6C_7$ | 10 | 0x1E | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2D | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | | $D_5$ | $D_6$ | $D_7$ |
| $O_0D_1D_2D_3/S_4D_5D_6D_7$ | 10 | 0x66 | $D_1$ | $D_2$ | $D_3$ | $O_0$ | | $D_5$ | $D_6$ | $D_7$ |
| $O_0D_1D_2D_3/O_4D_5D_6D_7$ | 10 | 0x55 | $D_1$ | $D_2$ | $D_3$ | $O_0$ | $O_4$ | $D_5$ | $D_6$ | $D_7$ |
| $S_0D_1D_2D_3/D_4D_5D_6D_7$ | 10 | 0x78 | $D_1$ | $D_2$ | $D_3$ | $D_4$ | | $D_5$ | $D_6$ | $D_7$ |
| $O_0D_1D_2D_3/C_4C_5C_6C_7$ | 10 | 0x4B | $D_1$ | $D_2$ | $D_3$ | $O_0$ | $C_4$ | $C_5$ | $C_6$ | $C_7$ |
| $T_0C_1C_2C_3/C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3/C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3/C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3/D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3/D_4D_5D_6T_7$ | 10 | 0xFF | $D_0$ | $D_1$ | $D_2$ | $D_3$ | $D_4$ | $D_5$ | $D_6$ | |

FIG. 6

One clock cycle

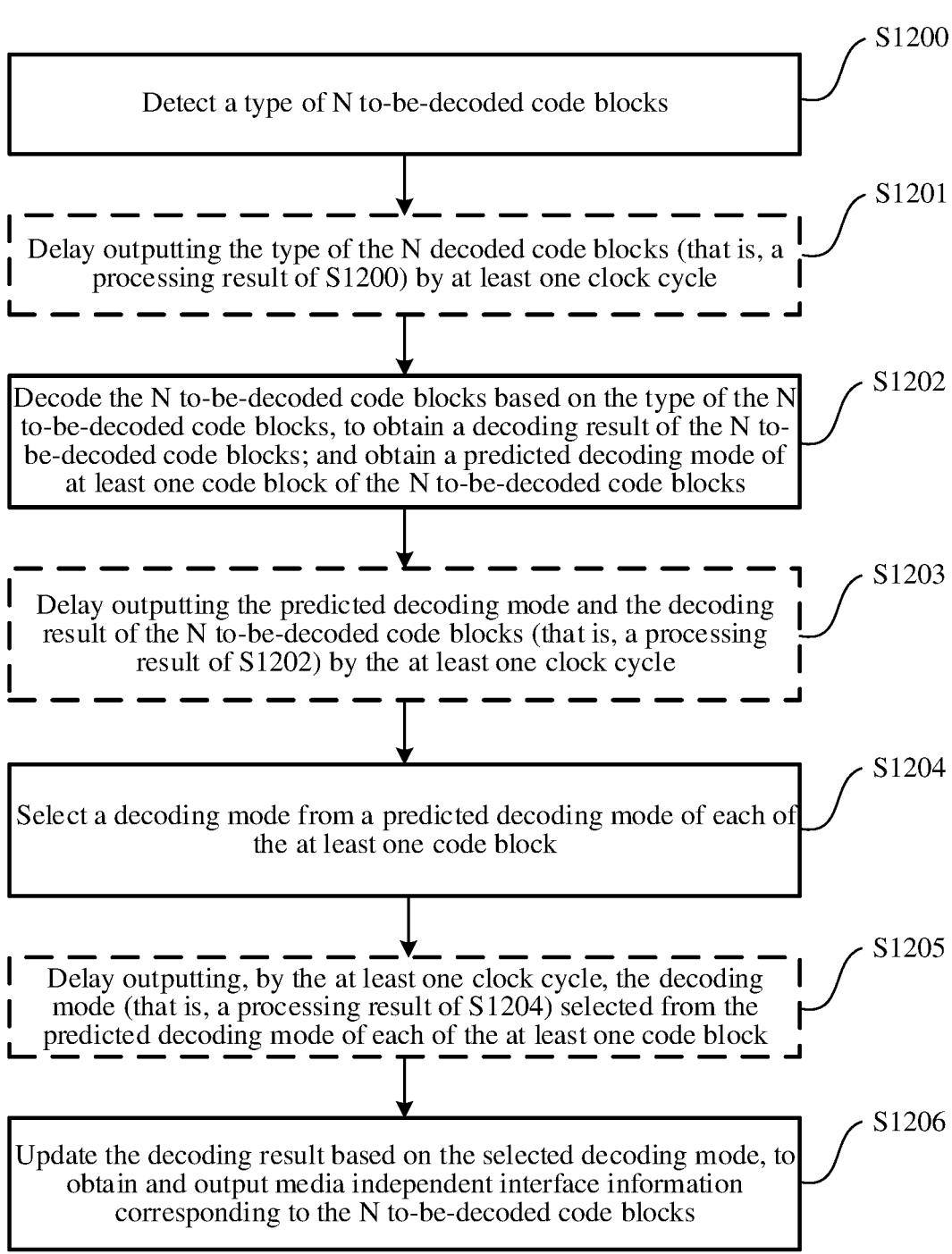

S1200

Detect a type of N to-be-decoded code blocks

S1201

Delay outputting the type of the N decoded code blocks (that is, a processing result of S1200) by at least one clock cycle

S1202

Decode the N to-be-decoded code blocks based on the type of the N to-be-decoded code blocks, to obtain a decoding result of the N to-be-decoded code blocks; and obtain a predicted decoding mode of at least one code block of the N to-be-decoded code blocks

S1203

Delay outputting the predicted decoding mode and the decoding result of the N to-be-decoded code blocks (that is, a processing result of S1202) by the at least one clock cycle

S1204

Select a decoding mode from a predicted decoding mode of each of the at least one code block

S1205

Delay outputting, by the at least one clock cycle, the decoding mode (that is, a processing result of S1204) selected from the predicted decoding mode of each of the at least one code block

S1206

Update the decoding result based on the selected decoding mode, to obtain and output media independent interface information corresponding to the N to-be-decoded code blocks

FIG. 12

DECODING METHOD AND APPARATUS

CROSS-REFERENCE TO RELATED APPLICATIONS

This application is a continuation of International Application No. PCT/CN2021/109382 filed on Jul. 29, 2021, the disclosure of which is hereby incorporated by reference in its entirety.

TECHNICAL FIELD

This application relates to the field of communication technologies, and in particular, to a decoding method and an apparatus.

BACKGROUND

An Ethernet physical layer includes a physical coding sublayer (PCS), a physical medium attachment (PMA) sublayer, and a physical medium dependent (PMD) sublayer from top to bottom. The PCS is located between a reconciliation sublayer (RS) of a medium access control (MAC) layer and the PMA sublayer. The PCS is used to map an Ethernet MAC stream to an encoding and physical layer signal system. Currently, 10G to 400G standards defined in the IEEE 802.3 protocol and an 800G proprietary standard all specify that PCS encoding uses 64b/66b encoding. An interface between the PCS and the upper layer RS/MAC sublayer is a media independent interface (MII).

64b/66b encoding is used to: perform encoding and mapping on eight pieces of 8-bit data and one 8-bit control signal that are transmitted through the MII, to generate a block payload, a synchronization header (sync header), and a block type field; and use the three to generate a 66-bit block based on a specified format for output in parallel.

The IEEE protocol specifies that, for state entering of one 66-bit block in 64b/66b decoding, reference needs to be made to a property of a next 66-bit block. Therefore, all decoding operations need to be completed in one clock cycle (that is, one cycle). Under a low bus bit width and an advanced process, usually, state entering of all 66-bit blocks can be completed in one clock cycle. However, under a large bus bit width or a backward process, for completion of the state entering of all the 66-bit blocks in the one clock cycle, a large risk of an implementation time sequence exists.

SUMMARY

Embodiments of this application provide a decoding method and an apparatus, to enable different bus bit widths or different processes to have compatible requirements on a time sequence of implementing decoding at a physical coding sublayer, and improve system compatibility and flexibility.

According to a first aspect, a decoder is provided, where the decoder includes:

a type detection module, configured to detect a type of N to-be-decoded code blocks, where the N to-be-decoded code blocks are arranged in sequence, and N is an integer greater than or equal to 1;

a decoding and prediction module, configured to: decode the N to-be-decoded code blocks based on the type of the N to-be-decoded code blocks, to obtain a decoding result of the N to-be-decoded code blocks; and obtain a predicted decoding mode of at least one code block of the N to-be-decoded code blocks;

a state determining module, configured to select a decoding mode from a predicted decoding mode of each of the at least one code block; and an output processing module, configured to update the decoding result based on the decoding mode, to obtain and output media independent interface information corresponding to the N to-be-decoded code blocks.

The decoder further includes a delay device, configured to delay outputting received data by at least one clock cycle, where the type detection module sends the type of the N to-be-decoded code blocks to the decoding and prediction module via the delay device; the decoding and prediction module sends the predicted decoding mode to the state determining module and the decoding result of the N to-be-decoded code blocks to the output processing module via the delay device; or the state determining module sends the decoding mode to the output processing module via the delay device.

Optionally, the decoder may be used for physical layer decoding, for example, may be used for PCS 64b/66b decoding.

In the foregoing implementation, the delay device is disposed in the decoder, so that outputting data is delayed by the at least one clock cycle, and the clock cycle is split. In this way, an operation that needs to be performed in the one clock cycle is split to be performed in two or more clock cycles. This can enable different bus bit widths or different processes to have compatible requirements on a time sequence of implementing decoding at a physical coding sublayer, and improve system flexibility.

In a possible implementation, the state determining module is configured to select a decoding mode from a predicted decoding mode of a first to-be-decoded code block based on a type of the first to-be-decoded code block and a type of a next code block of the first to-be-decoded code block, where the first to-be-decoded code block is any one of the at least one code block.

In the foregoing implementation, because the decoding mode corresponds to a state in an FSM, and in a given FSM state, there may be a plurality of FSM state entering cases based on different entering conditions. The entering condition is based on the type of the to-be-decoded code block (including a type of a to-be-decoded code block input in the FSM state, and further including a type of a next code block of the to-be-decoded code block). Therefore, the first to-be-decoded code block is used as an example, in the given FSM state (in other words, a decoding mode of a previous to-be-decoded code block of the first to-be-decoded code block), an entering condition in the FSM state may be determined based on the type of the first to-be-decoded code block and the type of the next code block of the first to-be-decoded code block. In this way, a unique FSM state that is entered may be determined (in other words, a decoding mode is selected from a plurality of predicted decoding modes of the first to-be-decoded code block), so that the FSM state is entered for decoding the first decoded code block.

In a possible implementation, the output processing module is configured to: if a decoding mode used by the decoding and prediction module for the first to-be-decoded code block is different from the decoding mode selected by the state determining module from the predicted decoding mode of the first to-be-decoded code block, update a decoding result of the first to-be-decoded code block based on the decoding mode selected by the state determining module from the predicted decoding mode of the first to-be-decoded code block, where the first to-be-decoded code block is any one of the at least one code block.

In a possible implementation, the output processing module is configured to: if the decoding mode selected from the predicted decoding mode of the first to-be-decoded code block is a decoding mode used in an error state, update the decoding result of the first to-be-decoded code block to error code, where the first to-be-decoded code block is any one of the at least one code block.

In a possible implementation, the output processing module is configured to: if the decoding mode selected from the predicted code block mode of the first to-be-decoded code block is a decoding mode used in a low-power state, update the decoding result of the first to-be-decoded code block to low-power control code, where the first to-be-decoded code block is any one of the at least one code block.

In the foregoing implementation, the output processing module corrects, based on a state determining result output by the state determining module, a decoding result obtained through decoding in advance, to ensure correctness of an output decoding result.

In a possible implementation, the type detection module includes N type detection submodules, and the N type detection submodules are in a one-to-one correspondence with the N to-be-decoded code blocks. The decoding and prediction module includes N decoding submodules and N prediction submodules, the N decoding submodules are in a one-to-one correspondence with the N to-be-decoded code blocks, and the N prediction submodules are in a one-to-one correspondence with the N to-be-decoded code blocks. The output processing module includes N output processing submodules, and the N output processing submodules are in a one-to-one correspondence with the N to-be-decoded code blocks.

Further, the N type detection submodules run in parallel, the N decoding submodules run in parallel, the N prediction submodules run in parallel, and the N output processing modules run in parallel.

In the foregoing implementation, the N type detection submodules run in parallel, the N decoding submodules run in parallel, the N prediction submodules run in parallel, and the N output processing modules run in parallel, so that decoding performance can be ensured.

In a possible implementation, the to-be-decoded code block is a 66-bit block descrambled by the physical coding sublayer PCS, the 66-bit block includes a 2-bit synchronization header and a 64-bit payload, the 64-bit payload includes 8-bit block type information and 56-bit data, and the media independent interface information includes 64-bit XGMII/XXVGMII interface data and 8-bit XGMII/XXVGMII interface control information.

According to a second aspect, a decoding method is provided, where the method includes:

detecting a type of N to-be-decoded code blocks, where N is an integer greater than or equal to 1; decoding the N to-be-decoded code blocks based on the type of the N to-be-decoded code blocks, to obtain a decoding result of the N to-be-decoded code blocks; and obtaining a predicted decoding mode of at least one code block of the N to-be-decoded code blocks; selecting a decoding mode from a predicted decoding mode of each of the at least one code block; and updating the decoding result based on the decoding mode selected from the decoding mode, to obtain and output media independent interface information corresponding to the N to-be-decoded code blocks. The method further includes at least one of the following operations; delaying outputting the type of the N decoded code blocks by at least one clock cycle; delaying outputting the predicted decoding mode and the decoding result of the N to-be-decoded code blocks by the at least one clock cycle; and delaying outputting, by at least one clock cycle, the decoding mode selected from the predicted decoding mode of each of the at least one code block.

In a possible implementation, the obtaining a predicted decoding mode of at least one code block of the N to-be-decoded code blocks includes: selecting a decoding mode from a predicted decoding mode of a first to-be-decoded code block based on a type of the first to-be-decoded code block and a type of a next code block of the first to-be-decoded code block, where the first to-be-decoded code block is any one of the at least one code block.

In a possible implementation, the updating the decoding result based on the decoding mode selected from the predicted decoding mode of each of the at least one code block includes: if a decoding mode used by the decoding and prediction module for the first to-be-decoded code block is different from the decoding mode selected by a state determining module from the predicted decoding mode of the first to-be-decoded code block, updating a decoding result of the first to-be-decoded code block based on the decoding mode selected by the state determining module from the predicted decoding mode of the first to-be-decoded code block, where the first to-be-decoded code block is any one of the at least one code block.

In a possible implementation, updating the decoding result based on the decoding mode selected from the predicted decoding mode of each of a part of the code blocks includes: if the decoding mode selected from the predicted decoding mode of the first to-be-decoded code block is a decoding mode used in an error state, updating the decoding result of the first to-be-decoded code block to error code, where the first to-be-decoded code block is any one of the at least one code block.

In a possible implementation, updating the decoding result based on the decoding mode selected from the predicted decoding mode of each of a part of the code blocks includes: if the decoding mode selected from the predicted code block mode of the first to-be-decoded code block is a decoding mode used in a low-power state, updating the decoding result of the first to-be-decoded code block to low-power control code, where the first to-be-decoded code block is any one of the at least one code block.

In a possible implementation, the to-be-decoded code block is a 66-bit block descrambled by a physical coding sublayer PCS, the 66-bit block includes a 2-bit synchronization header and a 64-bit payload, the 64-bit payload includes 8-bit block type information and 56-bit data, and the media independent interface information includes 64-bit XGMII/XXVGMII interface data and 8-bit XGMII/XXVGMII interface control information.

According to a third aspect, an electronic device is provided, where the electronic device includes one or more processors and one or more memories, the one or more memories store one or more computer programs, the one or more computer programs include instructions, and when the instructions are executed by the one or more processors, the electronic device is enabled to perform the method according to any one of the second aspect.

According to a fourth aspect, a computer-readable storage medium is provided, where the computer-readable storage medium includes a computer program, and when the computer program is run on an electronic device, the computer is enabled to perform the method according to any one of the second aspect.

According to a fifth aspect, a chip is provided, where the electronic device includes one or more processors and one or more memories, the one or more memories store one or more computer programs, the one or more computer programs include instructions, and when the instructions are executed by the one or more processors, the chip is enabled to perform the method according to any one of the second aspect.

According to a sixth aspect, a computer program product is provided, where when the computer program product is invoked by a computer, the computer is enabled to perform the method according to any one of the second aspect.

BRIEF DESCRIPTION OF DRAWINGS

FIG. 6 is a 64b/66b encoding table used by an XGMII/XXVGMII of a 10G/25GBASE-R according to an embodiment of this application;

FIG. 12 is a schematic flowchart of decoding according to an embodiment of this application.

DESCRIPTION OF EMBODIMENTS

The following describes in detail embodiments of this application with reference to the accompanying drawings.

Figure 1:
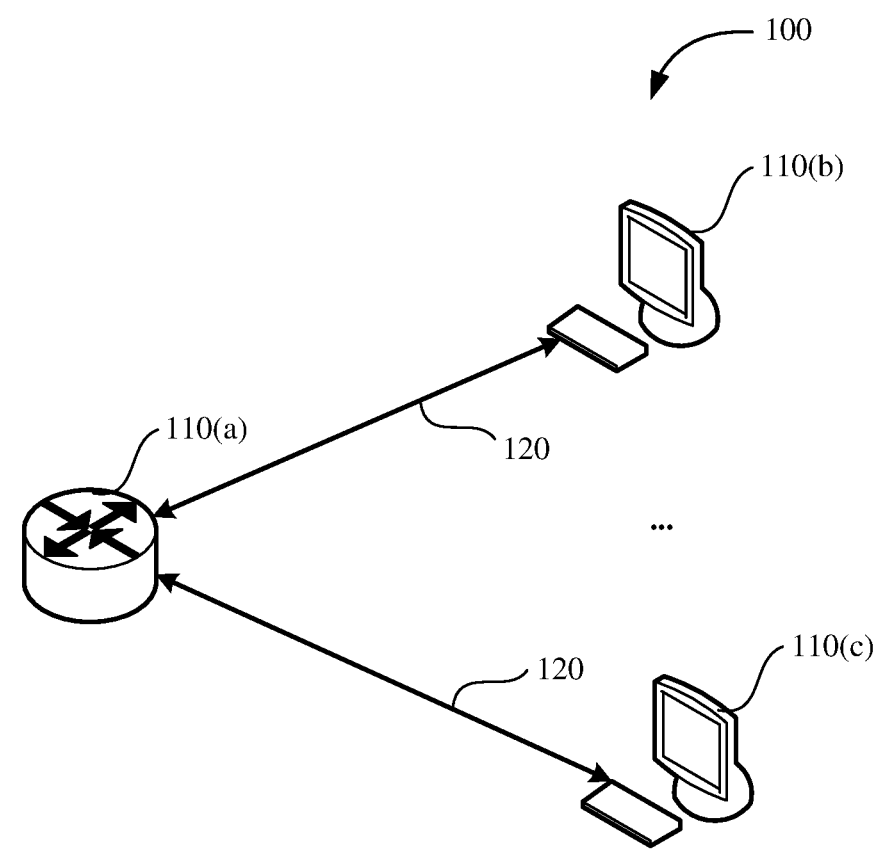
FIG. 1 is a schematic diagram of a communication system according to an embodiment of this application.

FIG. 1 is a block diagram of an example communication system 100 that can implement an embodiment of this application. The communication system 100 includes a network device (such as a switch or a router) 110(*a*). The network device 110(*a*) is coupled to a plurality of network devices 110(*b*) and 110(*c*) through respective data links (or physical lanes) 120. The network devices 110(*b*) and 110(*c*) may exchange data with the switch/router 110(*a*) through the respective data links 120. The network devices 110(*b*) and 110(*c*) may be any appropriate device that can access a network, including, for example, a computer, a switch, a router, a hub, a gateway, and an access point, and the like. In addition, according to this embodiment, the network devices 110(*b*) and 110(*c*) may include any electronic device that can be connected to a wired or wireless network, including, for example, a mobile phone, a personal digital assistant (PDA), a set-top box, or a game console. Certainly, the router/switch 110(*a*), the network devices 110(*b*) and 110(*c*), and the data link 120 are merely example components of a network, because the network may further include any quantity of appropriate devices to form a larger network (including, for example, a local area network (LAN), a wide area network (WAN), and a wireless LAN (WLAN)), and/or may be connected to the internet. The data link 120 may be any appropriate physical medium lane, including, for example, a coaxial cable, an optical fiber, and/or an unshielded/shielded twisted pair. The network devices 110 (*a*) to 110(*c*) may communicate with each other by using an Ethernet technology described in the IEEE 802.3 standard family.

Figure 2:
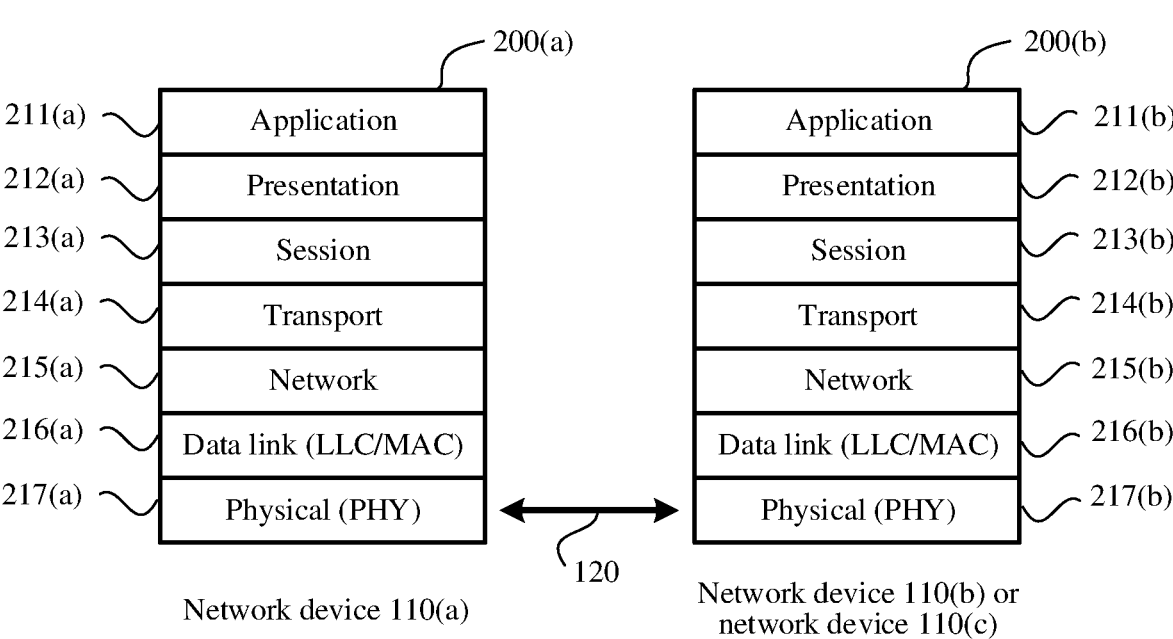
FIG. 2 is a schematic diagram of an open system interconnection model according to an embodiment of this application.

FIG. 2 is a block diagram of an open system interconnection (OSI) model 200(*a, b*) of the network devices 110(*a*) and 110(*b*) or 110(*c*) in FIG. 1. The OSI model 200(*a, b*) is divided into seven logical layers, including: an application layer 211(*a, b*), a presentation layer 212(*a, b*), a session layer 213(*a, b*), a transport layer 214(*a, b*), a network layer 215(*a, b*), a data link layer 216(*a, b*), and a physical layer 217(*a, b*) from top to bottom. The OSI model 200(*a, b*) may be used to present the network devices 110(*a*) and 110(*b*)/110(*c*), but it should be noted that another appropriate model may be used to present an Ethernet device configured according to this embodiment.

The physical layer 217(*a, b*) provides electrical and physical specifications for interaction between the network device 110 and a data link 120, including, for example, pin layout, signal voltage, and the like. The data link layer 216(*a, b*) provides functional and/or procedural regulations for data transmission between the network devices 110(*a*) and 110(*b*)/110(*c*), such as addressing and lane access control mechanisms. The data link layer 216(*a, b*) has two sublayers, and the two sublayers include a logical link control (LLC) layer and a MAC layer from top to bottom. For simplicity, in subsequent descriptions of this specification, the data link layer 216(*a, b*) is also referred to as the MAC layer. There is a media independent interface (MII) (not shown in the figure) between the MAC layer 216(*a, b*) and the physical layer 217(*a, b*). Examples of the MII include an XGMII (where the XGMII is defined as a 10G bit interface from the MAC to the physical layer), an XXVGMII (where the XXVGMII is defined as a 25G bit interface from the MAC to the physical layer), and the like.

Figure 3:
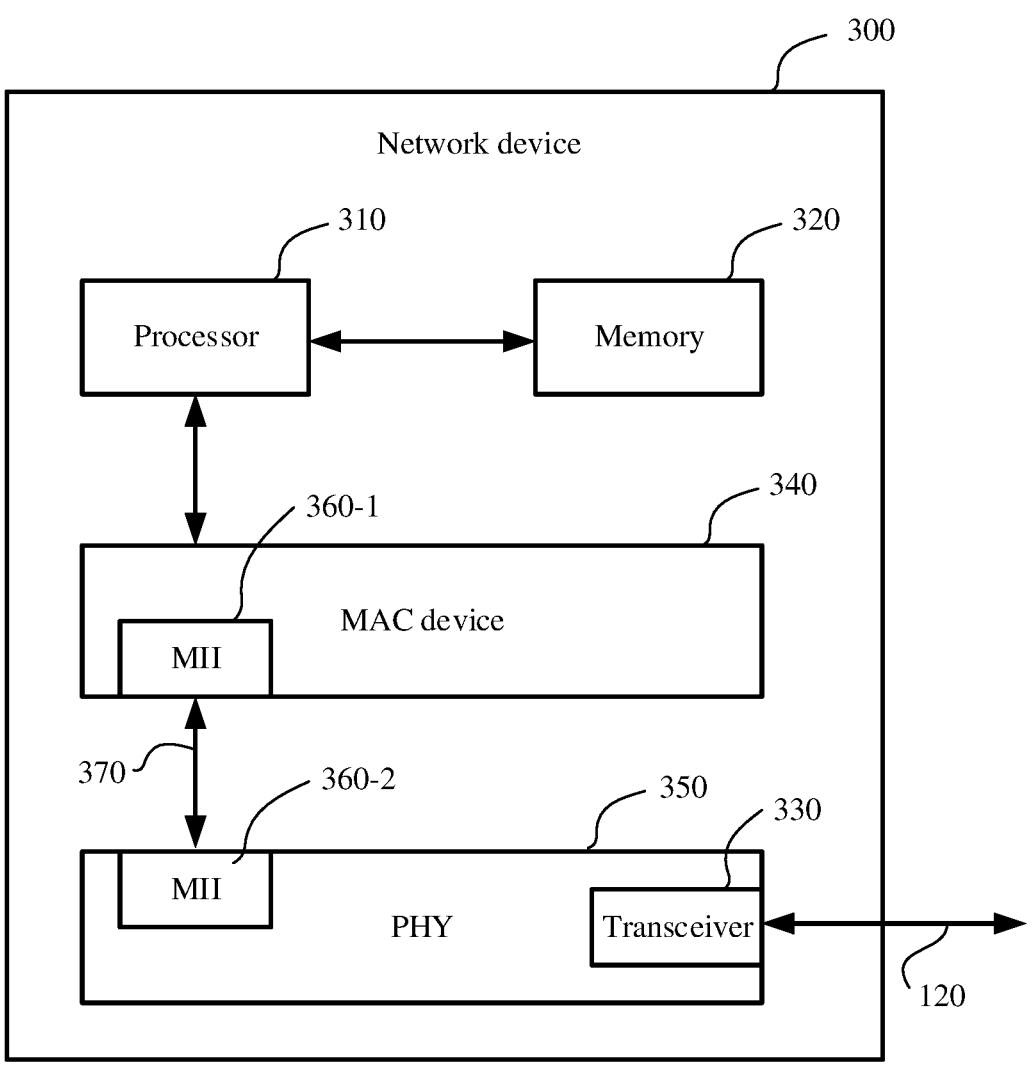
FIG. 3 is a schematic structural diagram of a network device according to an embodiment of this application.

FIG. 3 is a schematic structural diagram of a network device 300. The network device 300 may be one of the network devices 110(*a*), 110(*b*), and 110(*c*) in FIG. 1 and FIG. 2. The network device 300 includes a processor 310, a memory 320, and an Ethernet transceiver 330. The Ethernet transceiver 330 is coupled to one or more physical lanes 120. Although the Ethernet transceiver 330 is included in a PHY 350 as shown in FIG. 3, the transceiver 330 may be an independent device or an integrated circuit in another embodiment. The memory 320 may be any appropriate memory element or device, including, for example, an EEPROM or a flash memory. The processor 310 may be any appropriate processor that is capable of executing scripts or instructions of one or more software programs stored in, for example, the memory 320. The network device 300 may further include a well-known cache, where the cache stores frequently used instructions and/or data.

The network device 300 includes the physical layer device (PHY) 350 and a MAC layer device (or a MAC device) 340. The PHY 350 and the MAC device 340 respectively include MIIs 360-1 and 360-2, where the MIIs are configured to send a signal between the two devices along a signal path 370.

The MAC device 340 may be any device and an integrated circuit that implement a MAC layer function, and may be an independent device or may be integrated into the network device 300. Similarly, the PHY 350 may be any device or integrated circuit that implements a physical layer function, and may be an independent device or may be integrated into the network device 300. In some embodiments, both the PHY 350 and the MAC device 340 may be implemented in an integrated circuit mounted on a circuit board, and the signal path 370 may be implemented as a trace on the circuit board.

During a normal data transmission operation, when a terminal user software application on the network device 300 sends data over a network (for example, to the internet), the processor 310 processes the data based on a top layer of an OSI model, and then sends data to the PHY 350 via the MAC device 340. The PHY 350 performs operations such as encoding (for example, encoding in a 64b/66b mode) and scrambling on data from the MII, and then sends data to the physical lane 120 via the transceiver 330. After the transceiver 330 of the network device 300 receives the data from the physical lane 120 over the network, the PHY 350 performs operations such as descrambling and decoding on the data, and then sends data to the MAC device 340 through the MII.

Figure 4:
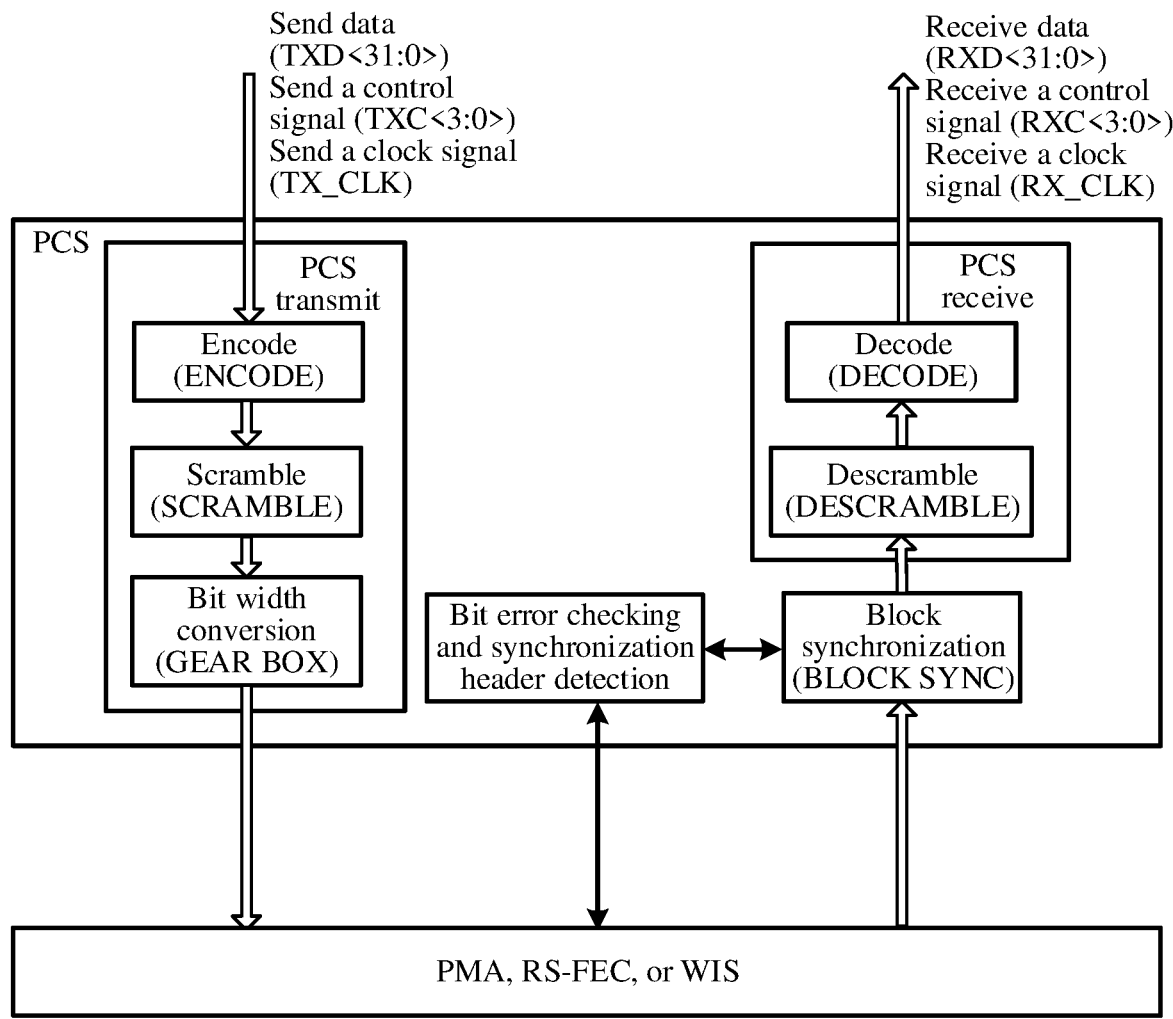
FIG. 4 is a schematic diagram of PCS 64b/66b encoding and decoding according to an embodiment of this application.

FIG. 4 is a schematic diagram of 64b/66b encoding and decoding according to an embodiment of this application. For example, an MII is an XGMII/XXVGMII. In an IEEE 802.3 PCS receive mode, the MAC layer sends data (TXD<31:0>) and a control signal (TDC<3:0>) and may further send a clock signal (TX_CLK) to a PCS through the XGMII/XXVGMII. The clock signal is not necessarily sent, and may not need to be sent to the PCS when the MAC layer and the PCS use a same clock signal. The PCS converts two pieces of data (TXD<31:0>) into eight pieces of data (TXD<63:0>) of an 8-bit width, converts two control signals (TDC<3:0>) into one control signal (TXC<7:0>) of an 8-bit width, and performs the 64b/66b encoding on the 64-bit data (TXD<63:0>) and the 8-bit control signal (TXC<7:0>), to obtain a 66-bit block; and then sends, after performing operations such as scrambling and bit width conversion (gear box) on the 66-bit block, the 66-bit block to a downstream module of PCS transmit for encapsulation and the like. The downstream module of the PCS transmit may be a PMA, or may be a Reed-Solomon forward error correction (RS-FEC) module or a WAN interface sublayer (WIS) sublayer, depending on an application scenario.

In the IEEE 802.3 PCS receive mode, the PCS receives data from the PMA, the RS-FEC module, or the WIS sublayer, and performs bit error checking and synchronization header detection on the received data. If the received data meets a signal quality requirement of a basic encoding rule (BER), the PCS performs descrambling and 64b/66b decoding on the received data, finally generates 64-bit received data (RXD<63:0>) and an 8-bit received control signal (RXC<7:0>), splits the 64-bit received data (RXD<63:0>) and the 8-bit received control signal (RXC<7:0>) into two pieces of data (RXD<31:0>) and two control signals (RXD<3:0>) respectively, and sends the two pieces of data (RXD<31:0>) and the two control signals (RXD<3:0>) to the MAC layer through the MII.

Figure 5:
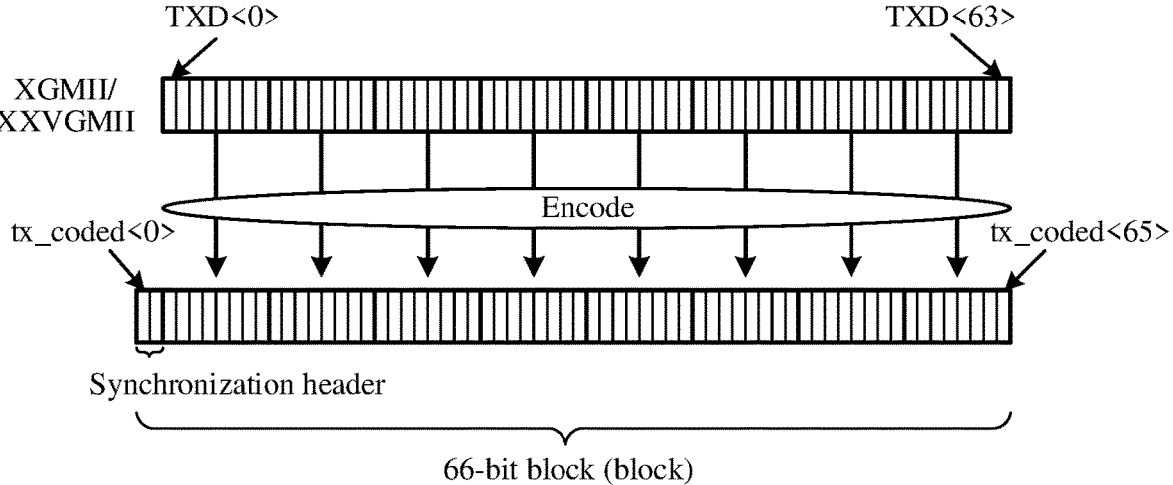
FIG. 5 is a schematic diagram of a 66b encoded block according to an embodiment of this application.

FIG. 5 is a schematic diagram of an encoded 66-bit block according to an embodiment of this application. A block is a basic processing unit of a PCS and includes 66 bits. The PCS maps MII (including, for example, an XGMII/XXVG-MII) structured data (TXD<63:0> and TXC<7:0>) into the 66-bit block (tx_coded<65:0>) based on a 64b/66b encoding scheme. A synchronization header (2 bits) of the 66-bit block (tx_coded<65:0>) is used to detect a boundary of the block in a PCS synchronization process on a receiving side, so that the receiving side can implement block alignment on a PHY bit stream. Each rectangle in FIG. 5 represents one piece of bit data. For the 66-bit block, bit data with a smaller index value is first transmitted on a physical link.

64b/66b encoding can improve a transmission characteristic of information transmitted on the link, and supports transmission of control and data characters. The 64b/66b encoding can ensure that a physical layer (PHY) bit stream has plenty of randomness, so that a clock recovery is properly implemented in a receiving direction. The 64b/66b encoding further reserves a possibility of detecting any single or more bit errors that may occur during information transmission and receiving.

A 10G/25G PCS supports a control character defined in the XGMII/XXVGMII (where control characters defined in the XGMII and XXVGMII are the same). The control character is represented as control code. The PCS uses TXC in the XGMII/XXVGMII to distinguish whether a corresponding byte is the control code or a data byte. If TXC is set, corresponding 8-bit data is the control code. For example, if TXC<0> is set, a $1^{st}$ byte <7:0> in TXD<63:0> is the control code. The PCS defines a symbol for each value of the control code, for example, as shown in Table 1.

TABLE 1

| | Control character set and symbol | | |
|---|---|---|---|
| Property (property) | Control code (control code) | Description | Symbol |
| Control characters (control characters) | 0x07 | Idle control character (Idle control character) | /I/ |
| | 0x06 | Low-power control character (LPI (Low-Power Idle) control character) | /LI/ |
| | 0x9C | Sequence control character (Sequence control character) | /Q/ |
| | 0xFB | Start control character (Start control character) | /S/ |
| | 0xFD | Terminate control character (Terminate control character) | /T/ |
| | 0xFE | Error control character (Error control character) | /E/ |
| | 0x5C | Signal ordered set in BASE-R (Signal ordered set in BASE-R) | /Fsig/ |

The following describes the control symbols in Table 1.

/I/: When the PCS receives the idle control character (0x07) from the MII, the PCS transmits the control character /I/. /I/ cannot be added or deleted by the PCS, otherwise predefined bandwidth is to be changed.

/LI/: When receiving the low-power (LPI) control character (0x06) from the MII, the PCS transmits the /LI/ character. The LPI control character /LI/ is consecutively sent instead of the control character /I/.

/S/: The start control character /S/ represents a start of a data packet. /S/ is valid only for a $1^{st}$ or $5^{th}$ byte in MII TXD<63:0>. If /S/ is received on any other byte in MII TXD<63:0>, it represents an error.

/T/: The terminate control character /T/ represents an end of a data packet. Because packet lengths are different, /T/ may occur in any byte in MII TXD<63:0>.

/O/: Ordered sets are used to extend a capability of sending control and state information through a link, such as a remote fault and local fault state. There are two types of ordered sets: a sequence ordered set and a signal ordered set. On the MII, the sequence ordered set includes one special control character /Q/ and three data bytes. The ordered set always starts from a $1^{st}$ or $5^{th}$ byte on the MII (including, for example, the XGMII/XXVGMII). The signal ordered set includes the special control character /Fsig/ and three data bytes following the special control character /Fsig/. In this specification, the control symbol /Q/ is equal to the control symbol /O/. In addition to the foregoing designation, if /Q/ is received on any other byte in TXD, it represents an error.

/E/: In a 64b/66b encoder, each time /E/ is detected from the MII, the error control character /E/ is generated. When the PCS detects an error from the MII, /E/ is also generated. /E/ allows the PCS to send the detected error.

The 64b/66b encoder receives data TXD<63:0> and a control signal TXC<7:0> from the XGMII/XXVGMII, and generates the 66-bit block by querying an encoding table. For example, FIG. 6 is a 64b/66b encoding table used by an XGMII/XXVGMII of 10GBASE-R/25GBASE-R.

In the encoding table shown in FIG. 6, a first column (input data) represents transmission data from the XGMII/XXVGMII. There are 16 encoding formats. Only one is encoded to be a data block (for example, $D_0D_1D_2D_3D_4D_5D_6D_7$ in the table), and the others are encoded to be control blocks. A second column (tx_coded) is the 66-bit block, and an encoding result of the 66-bit block includes a synchronization header (SYNC) column and a block payload column.

First two bits of the 66-bit block are the synchronization header (SYNC). A value of the synchronization header is shown as a binary value. There are two values of the synchronization header: "01" and "10". "01" represents that subsequent 64 bits are all data, and "10" represents that the subsequent 64 bits are control information or a mixture of the data and the control information. 8 bits next to the synchronization header are a block type field, and subsequent 56 bits are the control information, the data, or the mixture of the two.

In a block payload in the 66-bit block, data code is marked as $D_0$ to $D_7$, and one piece of data code is of 8 bits. The control characters /I/, /LI/, and /E/ are marked as $C_0$ to $C_7$. For the ordered set, the control character /Q/ or /Fsig/ is marked as $O_0$ or $O_4$, because the control character /Q/ or /Fsig/ is valid only on a $1^{st}$ or 5th 8-bit byte transmitted through the XGMII/XXVGMII. For a same reason, the control character /S/ is marked as $S_0$ or $S_4$. Because TXD<63:0> is created by using two transmission TXD<31:0>, a value of the block type field implicitly encodes /S/ as a $1^{st}$ or $5^{th}$ character of the block. The control character /T/ is marked as $T_0$ to $T_7$. A location of /T/ in the block is implicitly encoded in the block type field. When the block including /T/ is followed by a control block that does not include /T/ and /E/, data packet validity ends.

The subscript in the label in the foregoing encoding table (for example, the subscript "1" in "$D_1$") represents a location of a character in the eight bytes transmitted through the XGMII/XXVGMII. In FIG. 6, for a value shown as binary, a leftmost bit is transmitted first. Content of the block type field, the data 8-bit byte, and the control code are shown as hexadecimal values.

PCS 64b/66b decoding is an inverse operation of encoding. Definitions of data and control characters (or the control code) are the same as those of the encoding, and reference may be made to the encoding scheme shown in the PCS transmission part.

The PCS may perform the 64b/66b decoding based on a 64b/66b decoding finite state machine (FSM) and the encoding table (such as Table 1 and FIG. 6) to recover a raw data byte from descrambled input block stream. For each input block (a to-be-decoded 66-bit block), validation of each block is analyzed by using a context block based on a decoding state diagram, and a possible subsequent block type is predicted, and finally a current correct decoding state is determined. Once the decoding state is determined, a current block may be decoded, and a raw stream rx_raw<71:0> is obtained through remapping.

A 64b/66b decoding state machine or decoding state diagram is used to define a rule followed by the 64b/66b encoding and decoding. An Ethernet data packet that meets a format requirement may be output according to the rule. For example, FIG. 7 is a 64b/66b decoding state diagram according to an embodiment of this application.

Figure 7:
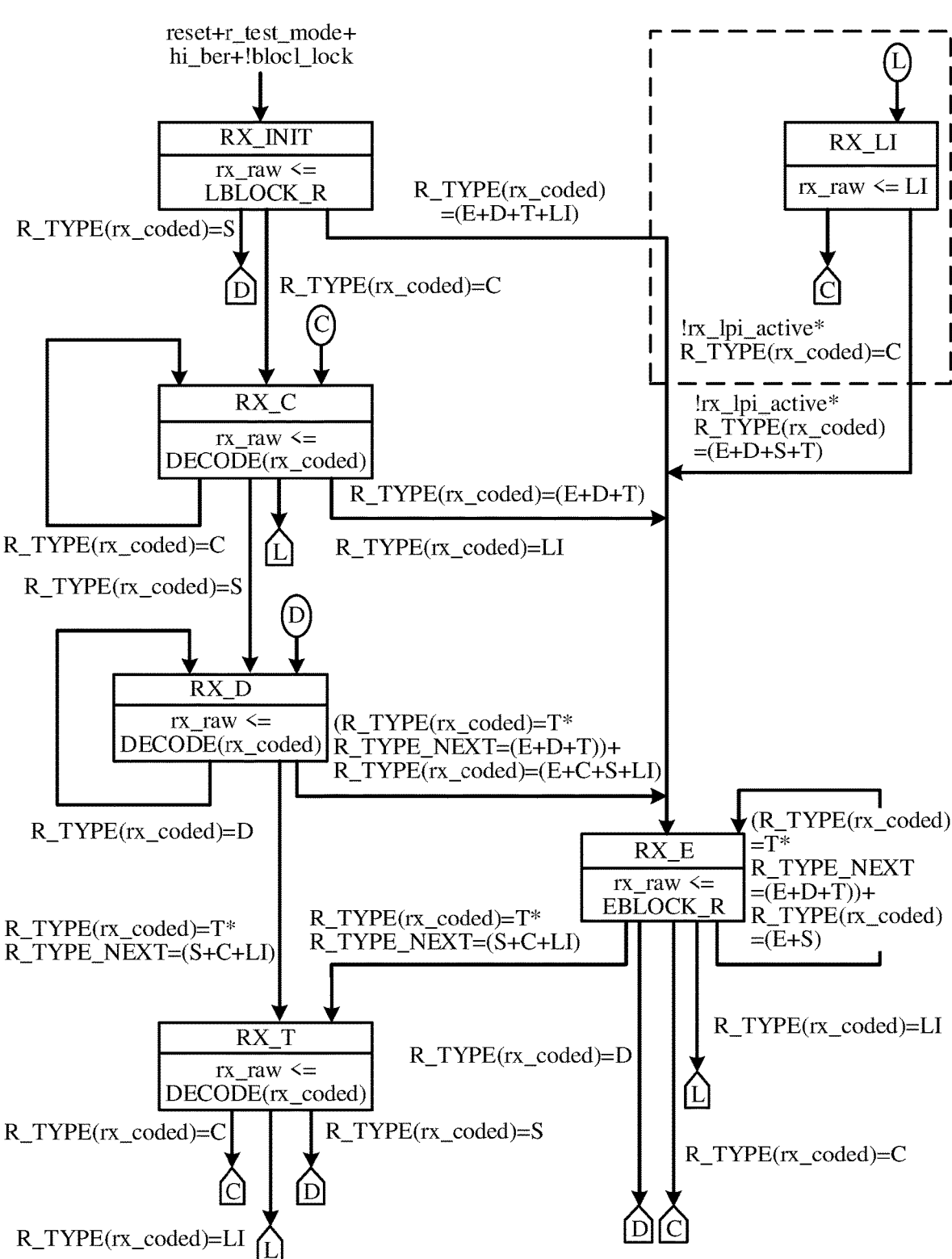
FIG. 7 is a 64b/66b encoding state diagram according to an embodiment of this application.

As shown in FIG. 7, if a descrambled vector rx_coded<65:0> is successfully delimited, or the vector rx_coded<65:0> is not a high bit error, or a current mode is a reset or test mode, an RX_INIT state (which may also be referred to as an initial state) is entered. After the RX_INIT state is entered, a 72-bit vector rx_raw<71:0> to be transmitted to the XGMII/XXVGMII is initialized, so that the vector includes two local fault ordered sets ordered sets.

In the RX_INIT state:

If the input vector rx_coded<65:0> is of an S type, it indicates that the vector includes the start control character /S/. In this case, an RX_D state (which may also be referred to as a data state) is entered.

If the input vector rx_coded<65:0> is of a C type, it indicates that the vector is a control code block that does not include the start control character /S/. In this case, an RX_C state (which may also be referred to as a control state) is entered.

If the input vector rx_coded<65:0> is of one of E, D, T, and LI types, an RX_E state (which may also be referred to as an error state) is entered.

The vector rx_coded<65:0> may be of one of the following types.

(1) Type C: The value of the synchronization header is 10 in binary, and one of the following conditions is met:
  (a) The value of the block type field is 0x1E, and eight valid control characters other than /E/ are included. If an EEE or LPI encoding function is supported, 0 or 4 characters are /LI/.
  (b) The value of the block type field is 0x2D or 0x4B, and valid O code and four valid control characters are included.
  (c) The value of the block type field is 0x55, and two pieces of valid O code are included.

(2) Type LI: For the EEE or LPI encoding function, the LI type is supported. The value of the synchronization header in the vector is 10 in binary, the value of the block type field is 0x1E, and eight control characters 0x06 (/LI/) are included.

(3) Type S: The value of the synchronization header is 10 in binary, and one of the following conditions is met:
  (a) The value of the block type field is 0x33, and four valid control characters are included.
  (b) The value of the block type field is 0x66, and valid O code is included.
  (c) The value of the block type field is 0x78.

(4) Type T: The value of the synchronization header is 10 in binary, and the following condition is met:

(a) The value of the block type field is 0x87, 0x99, 0xAA, 0xB4, 0xCC, 0xD2, 0xE1, or 0xFF, and all control characters are valid.

(5) Type D: The value of the synchronization header included in the vector is 01 in binary.

(6) Type E: The vector does not meet a criterion of any other value.

A valid control character is designated in a transmission part. If a block type is E, the block is an invalid block. The invalid block meets at least one of the following properties.

(a) The value of the synchronization header is 00 or 11 in binary.

(b) The value of the block type field is an invalid value (a value not included in the encoding table).

(c) When a corresponding field in *_PCS-_DEC_CBLK_IDEN is set to 0, any control character includes a value that is not included in a defined control code table.

(d) The block is considered the invalid block based on context.

(e) The value of the block type field is 0x1E, and the eight control characters are /E/.

After the RX_D state is entered, the current vector rx_coded<65:0> is decoded, and the vector rx_raw<71:0> is updated by using a decoding result.

In the RX_D state:

If the input vector rx_coded<65:0> is of the D type, it indicates that the vector is a data code block. In this case, the current state is maintained, the vector rx_coded<65:0> is decoded, and the vector rx_raw<71:0> is updated by using the decoding result.

If the input vector rx_coded<65:0> is of the T type and a next vector is of the S, C, or LI type, it indicates that a current input vector includes the terminate control character /T/, and a block type of a subsequent vector is correct. In this case, an RX_T state (which may also be referred to as an end state) is entered.

If the input vector rx_coded<65:0> is of the T type and the next vector is of the E, D, or T type, it indicates that the current input vector includes the terminate control character /T/, and the block type of the subsequent vector is incorrect. In this case, the RX_E state is entered. Alternatively, if the input vector rx_coded<65:0> is of the E, C, S, or LI type, the RX_E state is entered.

After the RX_T state is entered, the current vector rx_coded<65:0> is decoded, and the vector rx_raw<71:0> is updated by using the decoding result.

In the RX_T state:

If the input vector rx_coded<65:0> is of the C type, the RX_C state is entered.

If the input vector rx_coded<65:0> is of the LI type, an RX_LI state (which may also be referred to as a low-power state) is entered.

If the input vector rx_coded<65:0> is of the S type, the RX_D state is entered.

After the RX_C state is entered, the current vector rx_coded<65:0> is decoded, and the vector rx_raw<71:0> is updated by using the decoding result.

In the RX_C state:

If the input vector rx_coded<65:0> is of the C type, the current state is maintained, the current vector rx_coded<65:0> is decoded, and the vector rx_raw<71:0> is updated by using the decoding result.

If the input vector rx_coded<65:0> is of the S type, the RX_D state is entered.

If the input vector rx_coded<65:0> is of the LI type, the RX_LI state is entered.

If the input vector rx_coded<65:0> is of the E, D, or T type, the RX_E state is entered.

After the RX_LI state is entered, the eight control characters in the vector rx_raw<71:0> are updated to the "LI" character (0x06).

In the RX_LI state:

If a value of rx_lpi_active is "false" and a new input vector rx_coded<65:0> is of the C type, the state is changed to the RX_C state, where when the value of rx_lpi_active is "false", it indicates that PCS receive is in an active state and data can be received.

If the value of rx_lpi_active is "false" and the new input vector rx_coded<65:0> is of the E, D, S, or T type, the state is changed to the RX_E state.

After the RX_E state is entered, eight pieces of 8-byte data in the vector rx_raw<71:0> is set to/E/.

In the RX_E state:

If the input vector rx_coded<65:0> is of the T type and the next vector is of the S, C, or LI type, the state is changed to the RX_T state.

If the input vector rx_coded<65:0> is of the D type, the state is changed to the RX_D state.

If the input vector rx_coded<65:0> is of the C type, the state is changed to the RX_C state.

If the input vector rx_coded<65:0> is of the LI type, the state is changed to the RX_LI state.

If the input vector rx_coded<65:0> is of the T type and the next vector is of the E, D, or T type, or if the input vector rx_coded<65:0> is of the E or S type, the RX_E state is maintained.

Based on the above 64b/66b decoding state diagram shown in FIG. 7, when any condition for stopping decoding is met, a decoding process may be stopped immediately, and two local fault ordered sets are continuously transmitted on an XGMII/XXVGMII of an Ethernet PHY.

Figure 8:
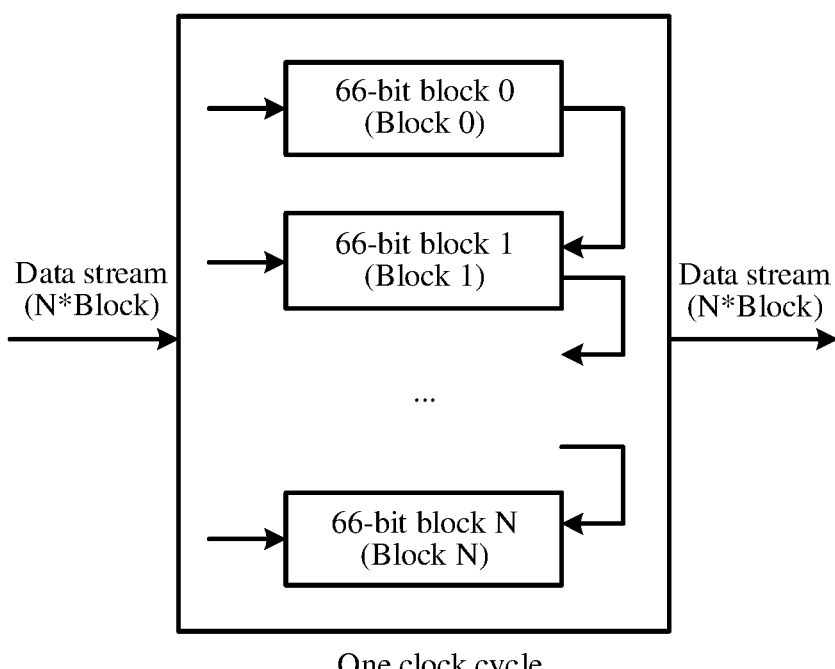
FIG. 8 is a schematic diagram of a decoding process of a conventional 64b/66b block.

An IEEE protocol specifies that, for state entering of a current 66-bit block in 64b/66b decoding, reference needs to be made to a property of a next 66-bit block. Therefore, in conventional 64b/66b encoding and decoding implementation, all operations are completed in one clock cycle (that is, one cycle). For example, FIG. 8 is a schematic diagram of completing decoding on N (where N is an integer greater than or equal to 1, for example, N=8) 66-bit blocks in one clock cycle. Based on the decoding state diagram shown in FIG. 7, when one 66-bit block is input in a current FSM state, determining a specific FSM state that needs to be entered for decoding the input 66-bit block needs to depend on a type of a next 66-bit block. Therefore, a decoding operation on the N 66-bit blocks needs to be completed in one clock cycle. A decoding process of the N 66-bit blocks is of a serial structure, and a decoding process of one 66-bit block may include block type prediction, decoding based on the block type, output processing on a decoding result, and the like. Under a low bus bit width and an advanced process, in one clock cycle, a risk of a time sequence of implementing decoding of the N 66 bit blocks based on FSM state entering determining on the N 66 bit blocks is low. However, under a large bus bit width or a backward process, a high risk of the implementation time sequence exists.

To resolve the foregoing problem, embodiments of this application provide a decoding method and an apparatus that can implement the method. In embodiments of this application, a decoding operation on N blocks in one clock cycle is split to be performed in two or more clock cycles. Further, the decoding operation on the N blocks is processed in parallel in at least one clock cycle. This can ensure the implementation time sequence, enable different processes or different bus bit widths to be compatible, and improve system compatibility and flexibility. Embodiments of this application may be applied to 64b/66b decoding implementation, or may be applied to another type of decoding implementation. Embodiments of this application may be implemented at a physical layer (PHY), for example, may be implemented at a PCS sublayer.

The following describes in detail embodiments of this application with reference to the accompanying drawings.

Figure 9:
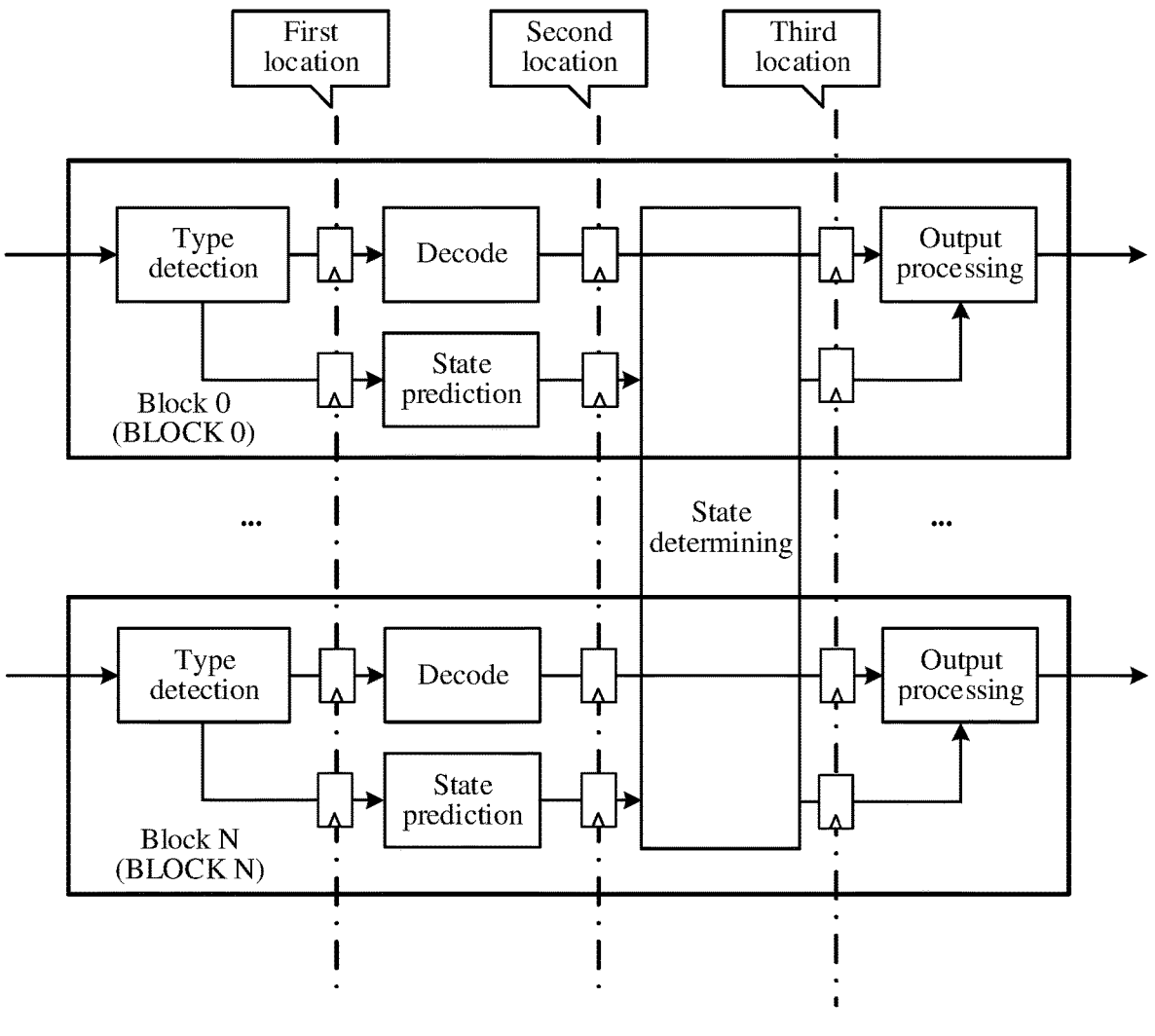
FIG. 9 is a schematic diagram of a decoding principle applied to a physical coding sublayer according to an embodiment of this application.

FIG. 9 is a schematic diagram of a decoding implementation principle according to an embodiment of this application. Optionally, the decoding implementation principle may be applied to the physical layer, for example, may be applied to a PCS 64b/66b decoding process.

For a to-be-decoded code block (for example, a 66-bit block), a decoding process of the to-be-decoded code block may include operations such as type detection, decoding, state prediction, state determining, and output processing. The type detection operation includes detecting a type of the to-be-decoded code block. The decoding operation includes decoding the to-be-decoded code block based on the type of the to-be-decoded code block. The state prediction operation includes: for a next to-be-decoded code block of a current to-be-decoded code block, predicting all possible decoding modes (which are referred to as predicted decoding modes in embodiments of this application) of the next to-be-decoded code block. The state determining operation includes: for the to-be-decoded code block, selecting a decoding mode from a predicted decoding mode of the to-be-decoded code block. The output processing operation includes: for the to-be-decoded code block, determining, based on a decoding mode used when the decoding operation is performed on the to-be-decoded code block and the decoding mode selected from the predicted decoding mode of the to-be-decoded code block, whether a decoding result of the code block needs to be updated; and if the decoding result needs to be updated, updating the decoding result of the code block based on the decoding mode selected from the predicted decoding mode of the to-be-decoded code block, and outputting media independent interface information (for example, the media independent interface information may include media independent interface data and media independent interface control information) corresponding to the to-be-decoded code block. For exemplary implementations of the foregoing operations such as type detection, decoding, state prediction, state determining, and output processing, refer to related content in FIG. 10 and FIG. 11.

In this embodiment of this application, a delay device may be disposed in a decoder, and is configured to delay outputting received data by at least one clock cycle. Optionally, outputting of a type detection result may be delayed by one or more clock cycles by using the delay device. Optionally, outputting of the decoding result may be delayed by the one or more clock cycles by using the delay device, and outputting of a result of decoding mode prediction may be delayed by the one or more clock cycles by using the delay device. Optionally, outputting of the predicted decoding mode may be delayed by the one or more clock cycles by using the delay device.

Optionally, the delay device may be a register. The register may be, for example, a D trigger. After the D trigger is triggered by a trigger signal (for example, a clock signal), stored data is output.

It should be noted that the "register" in this embodiment of this application may be one register or a register group including at least two registers. This mainly depends on data bandwidth and a register bit width. For example, if output data is of 8 bits, one 8-bit register or two 4-bit registers may be disposed.

For ease of understanding, for example, in the following, a location between the type detection operation and the decoding and state prediction operations is referred to as a first location, a location between the decoding and state prediction operations and the state determining operation is referred to as a second location, a location between the state determining operation and the output processing operation is referred to as a third location, and the second location and the third location are included between the decoding operation and the output processing operation. In this embodiment of this application, the delay device may be disposed at at least one location of the first location, the second location, and the third location, so that an output of a previous-level operation is delayed by the at least one clock cycle and then sent to a next-level operation at a location at which the delay device is disposed.

Optionally, delaying may be implemented by disposing the delay device at at least one location of the first location, the second location, and the third location. For example, the register (where a box including a triangle in FIG. 9) represents the register) is inserted at the first location, so that output data of the type detection operation is delayed by the at least one clock cycle by using the register and then is output to the decoding operation and the state prediction operation, to be used as input data of the decoding operation and the state prediction operation.

According to the foregoing decoding implementation principle, in this embodiment of this application, delaying is inserted between adjacent operations, so that data is delayed by the at least one clock cycle, and the clock cycle is split. In this way, an operation that needs to be performed in one clock cycle is split to be performed in two or more clock cycles. This can enable different bus bit widths or different processes to have compatible requirements on a time sequence of implementing decoding at a physical coding sublayer, and improve system flexibility.

The decoding method provided in this embodiment of this application is applicable to the PCS 64b/66b decoding process, and may be further applicable to a similar decoding process implemented at a physical sublayer.

Figure 10:
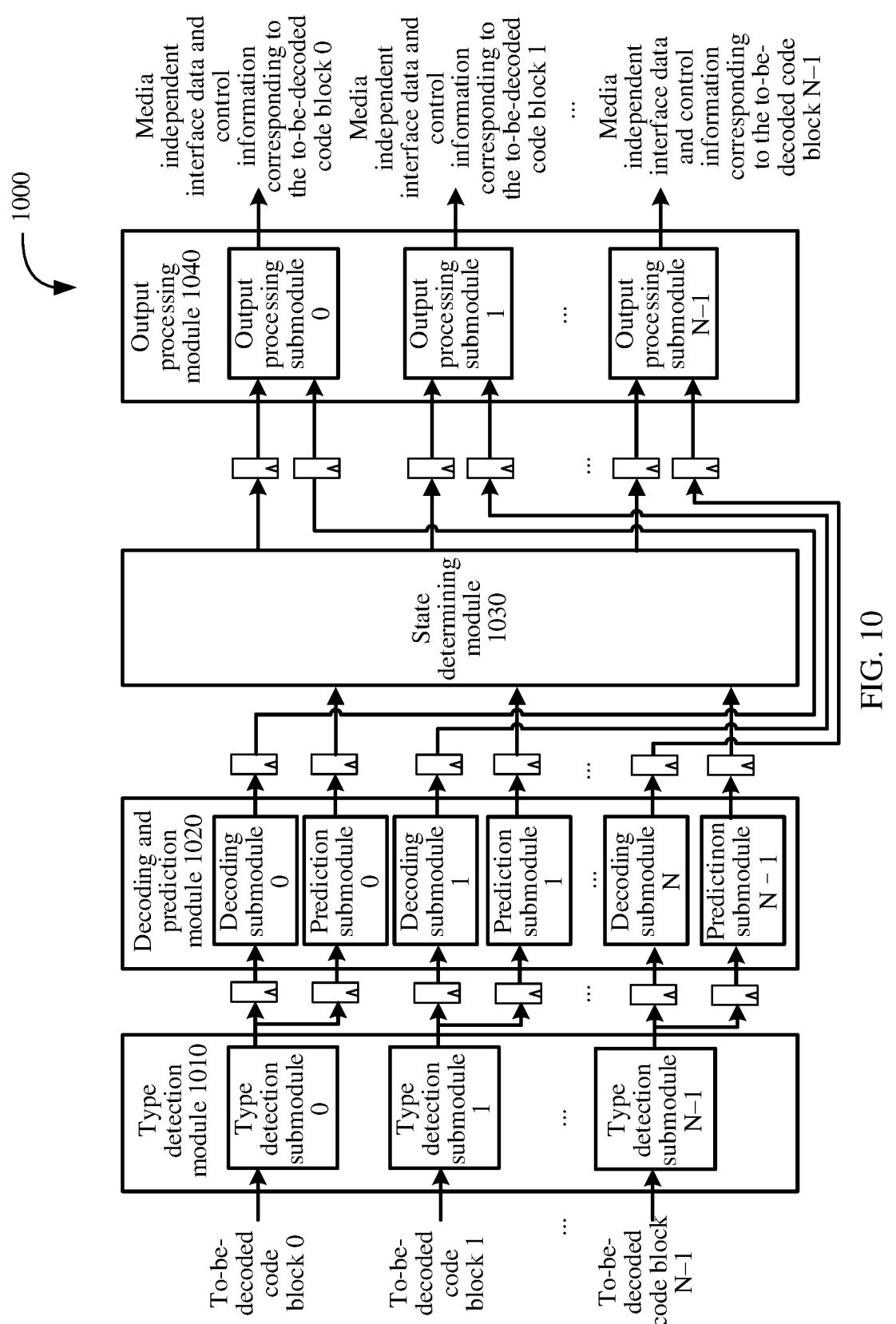
FIG. 10 is a schematic structural diagram of a 64b/66b decoder according to an embodiment of this application.

According to the foregoing decoding principle, FIG. 10 shows a structure of a decoder according to an embodiment of this application.

FIG. 10 is a schematic structural diagram of the decoder according to an embodiment of this application. The decoder may be implemented in a hardware manner, for example, implemented by using a field programmable gate array (FPGA) or another integrated circuit. Alternatively, the decoder may be implemented in a software manner, or may be implemented by using a combination of software and hardware. This is not limited in this embodiment of this application.

As shown in FIG. 10, the decoder 1000 provided in this embodiment of this application may include a type detection module 1010, a decoding and prediction module 1020, a state determining module 1030, and an output processing module 1040.

The type detection module 1010 is configured to detect a type of N to-be-decoded code blocks, where the N to-be-decoded code blocks are arranged in sequence, and N is an integer greater than or equal to 1, for example, N=8. The decoding and prediction module 1020 is configured to: decode the N to-be-decoded code blocks based on the type of the N to-be-decoded code blocks, to obtain a decoding result of the N to-be-decoded code blocks; and obtain a predicted decoding mode of at least one code block of the N to-be-decoded code blocks. The state determining module 1030 is configured to select a decoding mode from a predicted decoding mode of each of the at least one code block. The output processing module 1040 is configured to update the decoding result based on the decoding mode, to obtain and output media independent interface information corresponding to the N to-be-decoded code blocks.

For example, that a first to-be-decoded code block is any one of the at least one code block is used as an example. If a decoding mode used by the decoding and prediction module 1020 for the first to-be-decoded code block is different from the decoding mode selected by the state determining module 1030 from a predicted decoding mode of the first to-be-decoded code block, the output processing module 1040 updates a decoding result of the first to-be-decoded code block based on the decoding mode selected by the state determining module 1030 from the predicted decoding mode of the first to-be-decoded code block. For example, in some embodiments, if the decoding mode selected by the output processing module 1040 from the predicted decoding mode of the first to-be-decoded code block is a decoding mode used in an error state, the output processing module 1040 updates the decoding result of the first to-be-decoded code block to error code. In some other embodiments, if the decoding mode selected by the output processing module 1040 from the predicted code block mode of the first to-be-decoded code block is a decoding mode used in a low-power state, the output processing module 1040 updates the decoding result of the first to-be-decoded code block to low-power control code.

The decoder 1000 further includes a delay device (where a box including a triangle in FIG. 10 represents the delay device), configured to delay outputting received data by at least one clock cycle. Optionally, the type detection module 1010 may send the type (that is, a type detection result) of the N to-be-decoded code blocks to the decoding and prediction module 1020 via the delay device. Optionally, the decoding and prediction module 1020 may send the predicted decoding mode (that is, a prediction result) to the state determining module 1030 via the delay device, and send the decoding result of the N to-be-decoded code blocks to the output processing module 1040. Optionally, the state determining module 1030 may send, to the output processing module 1040 via the delay device, the decoding mode (that is, a determining result) selected from the predicted decoding mode.

For example, the type detection module 1010 may output the type detection result to the decoding and prediction module 1020 by using a level-1 register. The decoding and prediction module 1020 may output the prediction result to the state determining module 1030 by using the level-1 register, and output the decoding result to the output processing module 1040 by using a level-2 register. The state determining module 1030 outputs the determining result to the processing module 1040 by using the level-1 register.

It may be understood that the predicted decoding mode of the to-be-decoded code block may be understood as: based on a decoding finite state machine (FSM), in an FSM state, for an input to-be-decoded code block, an FSM state that may be entered. There may be one or more FSM states that may be entered, and each FSM state corresponds to a decoding mode. In this case, these FSM states that may be entered correspond to the predicted decoding mode of the to-be-decoded code block. For example, in a 64b/66b decoding FSM, in an RX_D state, for a currently input to-be-decoded code block, based on three entering conditions in the RX_D state, one of three FSM states may be entered for decoding the to-be-decoded code block, and three decoding modes corresponding to the three FSM states are predicted decoding modes of the to-be-decoded code block.

It may be understood that, in some cases, a current to-be-decoded code block is a code block i, and the decoding FSM is currently in a state 1. If only a state 2 can be entered from the state 1, for a code block i+1 (in other words, a next code block of the code block i), a decoding mode that can be used is unique (in other words, a decoding mode corresponding to the state 2). Therefore, decoding mode prediction may not need to be performed on the to-be-decoded code block i+1. Certainly, the decoding mode corresponding to the state 2 may be determined as a predicted decoding mode of the decoded code block i+1.

Optionally, the state determining module 1030 may be configured to select the decoding mode from the predicted decoding mode of the first to-be-decoded code block based on a type of the first to-be-decoded code block (where the first to-be-decoded code block is any one of the at least one code block) and a type of a next code block of the first to-be-decoded code block.

Because a decoding mode corresponds to a state in the FSM, in a given FSM state, there may be a plurality of FSM state entering cases based on different entering conditions. The entering condition is based on the type of the to-be-decoded code block (including a type of a to-be-decoded code block input in the FSM state, and further including a type of a next code block of the to-be-decoded code block). Therefore, the first to-be-decoded code block is used as an example, in a given FSM state (in other words, a decoding mode of a previous to-be-decoded code block of the first to-be-decoded code block), an entering condition in the FSM state may be determined based on the type of the first to-be-decoded code block and the type of the next code block of the first to-be-decoded code block. In this way, a unique FSM state that is entered may be determined (in other words, a decoding mode is selected from a plurality of predicted decoding modes of the first to-be-decoded code block), so that the FSM state is entered for decoding the first decoded code block.

In the decoder provided in the foregoing embodiment, the decoding and prediction module 1020 may decode N code blocks in advance, and decoding of one code block is based on a type of the code block. This may cause a decoding error (where because in some cases, for the decoding of the one code block, a decoding mode to be used needs to be determined based on both the type of the code block and a type of a next code block). Therefore, a decoding result may be inaccurate (in other words, the used decoding mode may be inaccurate). The decoding and prediction module 1020 predicts a decoding mode of the to-be-decoded code block, and then the state determining module 1030 selects a determined decoding mode from the decoding mode. In this way, when the decoding mode used by the decoding and prediction module 1020 for the to-be-decoded code block is different from the decoding mode determined by the state determining module 1030, the output processing module 1040 updates a decoding result of the to-be-decoded code block based on the decoding mode determined by the state determining module 1030, to ensure decoding accuracy.

In the decoder provided in the foregoing embodiment, inputting of output data of at least one module of the type detection module 1010, the decoding and prediction module 1020, and the state determining module 1030 to a next-level module may be delayed by using the delay device (for example, a register), so that the data is delayed by the at least one clock cycle, and the clock cycle is split. In this way, a decoding operation that needs to be performed in one clock cycle is split to be performed in two or more clock cycles. This can enable different bus bit widths or different processes to have compatible requirements on a time sequence of implementing decoding at a physical coding sublayer, and improve system flexibility.

Optionally, in the decoder 1000 provided in this embodiment of this application, the type detection module 1010 includes N type detection submodules, and the N type detection submodules are in a one-to-one correspondence with the N to-be-decoded code blocks, in other words, one type detection submodule is configured to decode one to-be-decoded code block. The decoding and prediction module 1020 includes N decoding and prediction submodules, and the N decoding and prediction submodules are in a one-to-one correspondence with the N to-be-decoded code blocks, in other words, one decoding and prediction submodule is configured to decode one to-be-decoded code block and predict a type of a next to-be-decoded code block of the to-be-decoded code block. The output processing module 1040 includes N output processing submodules, and the N output processing submodules are in a one-to-one correspondence with the N to-be-decoded code blocks, in other words, one output processing submodule is configured to perform output processing on a decoding result of one to-be-decoded code block. It may be understood that the decoder 1000 includes N lanes of decoding, each lane of decoding is used to process one to-be-decoded code block, each lane of decoding includes one type detection submodule, decoding and prediction submodule, and output processing submodule. The N lanes of decoding may share the state determining module 1030.

Optionally, the N type detection submodules run in parallel, N decoding submodules run in parallel, N prediction submodules run in parallel, and the N output processing modules run in parallel.

Optionally, the decoding and prediction submodule may include the decoding submodule and the prediction submodule, to implement a decoding operation and a type prediction operation respectively.

The following uses 64b/66b encoding as an example to describe in detail functions implemented or operations performed by the modules in the foregoing decoder.

Figure 11:
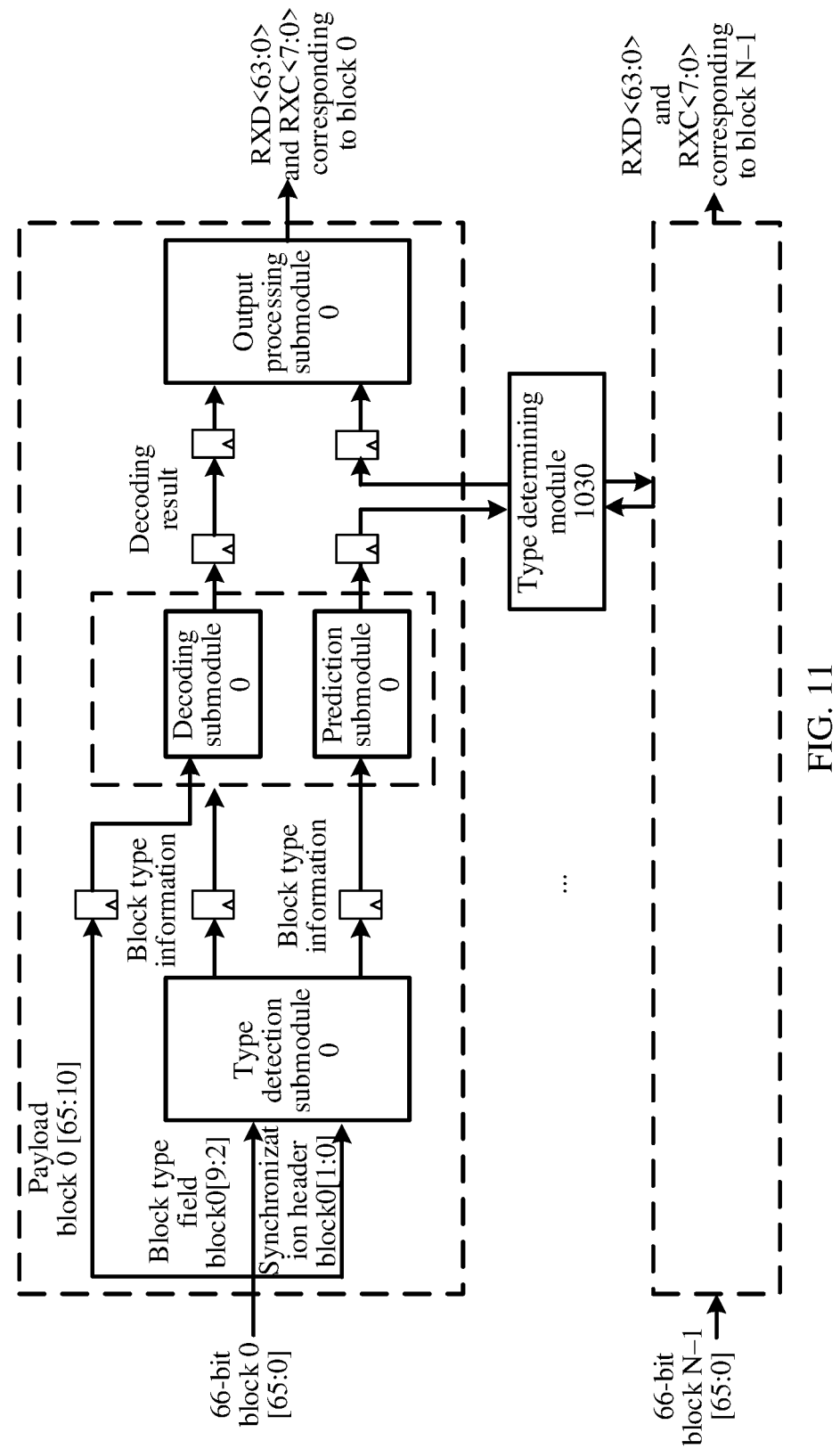
FIG. 11 is a schematic structural diagram of a decoder applicable to 64b/66b encoding according to an embodiment of this application.

The 64b/66b encoding is used as an example. FIG. 11 shows a decoder structure applicable to the 64b/66b encoding and a schematic diagram of an input and an output. A 2-bit synchronization header block0[1:0] and an 8-bit block type field block0[9:2] in a 66-bit block block 0 after PCS descrambling are input to a type detection submodule 0 in a type detection module 1010. If a value of the synchronization header is "01", the type detection submodule 0 determines that block 0 is a data code block. If the value of the synchronization header is "10", the type detection submodule 0 determines that block 0 is a control code block. Otherwise, it is determined that an encoding error occurs in block 0. Further, if block 0 is the control code block, a block type of block 0 is determined by querying a 64b/66b encoding table (for example, as shown in FIG. 6) based on a value of the block type field of block 0, and the block type of block 0 may indicate a format of block 0. The block type of block 0 may be one of types C, LI, S, T, D and E. Sending of type information of block 0 that is detected by the type detection submodule 0 to a decoding submodule 0 and a prediction submodule 0 is delayed by one clock cycle by using a register. A type detection method of another to-be-decoded code block is similar.

The decoding submodule 0 obtains a type detection result of block 0 that is output by the type detection submodule 0 and 56-bit data block[65:10] in block 0, and decodes the 56-bit data block[65:10] into 64-bit data rx_coded0 in a corresponding format by querying the 64b/66b encoding table (for example, as shown in FIG. 6). Sending of a decoding result (that is, the 64-bit data rx_coded0) to an output processing submodule 0 is delayed by two clock cycles by using a level-2 register. A decoding method of another to-be-decoded code block is similar.

Optionally, the decoding submodule 0 may further generate 8-bit control information based on the block type of block 0, where a value of each bit in the control information indicates whether a corresponding 8-bit byte in rx_coded0 is data code or control code. The decoding submodule 0 may output the 64-bit data rx_coded0 and the generated 8-bit control information as the decoding result to the output processing submodule 0 Further, the decoding submodule 0 may further send, to the output processing submodule 0 indication information of a decoding mode used for block 0.

After obtaining the type detection result of block (that is output by the type detection submodule 0 the prediction submodule 0 predicts, according to a 64b/66b encoding and decoding rule (for example, a 64b/66b decoding state diagram, as shown in FIG. 7), based on the block type of block 0 and a corresponding FSM state (in other words, a state of an FSM state machine when block 0 is decoded), a specific FSM state or specific FSM states may be entered for decoding a next 66-bit block block 1. For example, based on the FSM shown in FIG. 7, if a type of block 0 is S, an RX_D state is entered for decoding block 0. In this case, for a next block block 1, based on a corresponding condition, there may be three state entering possibilities: (1) The current RX_D state is maintained, in other words, block 1 is decoded in the RX_D state. (2) An RX_T state is entered, in other words, the RX_T state is entered for decoding block 1. (3) An RX_E state is entered, in other words, the RX_E state is entered for decoding block 1. Sending of a prediction result of the prediction submodule 0 to a state determining module 1030 is delayed by the one clock cycle by using the register. Optionally, the prediction result of the prediction submodule 0 may include a block index (for example, an index of block 0 and/or block 1) and indication information of all decoding modes (that is, FSM states) that may be used to decode block 1 and that are obtained through prediction. A decoding mode prediction method of another to-be-decoded code block is similar.

Optionally, a type of each code block in block 0 to block N−1 may be sent by the type detection module 1010 to the state determining module 1030, or may be sent by a corresponding prediction submodule to the state determining module 1030. For example, the prediction submodule 0 may send the type of block 0 to the state determining module 1030, a prediction submodule 1 may send a type of block 1 to the state determining module 1030, and so on.

The state determining module 1030 is configured to select a decoding mode from a predicted decoding mode of each code block based on the type of the code block and the 64b/66b decoding state diagram (as shown in FIG. 7), to obtain a determining result, where sending of the determining result to a corresponding output processing submodule is delayed by the one clock cycle by using the register. For example, a predicted decoding mode of block 1 that is received by the state determining module 1030 from the prediction submodule 0 includes: a decoding mode corresponding to RX_D, a decoding mode corresponding to RX_T, and a decoding mode corresponding to RX_E. The type of block 1 that is received from the prediction submodule 1 is the type D. In this case, the decoding mode corresponding to RX_D is selected from the foregoing three decoding modes based on the decoding state diagram shown in FIG. 7, and indication information of the decoding mode is sent to an output processing submodule 1. Optionally, determining information output by the state determining module 1030 may include the indication information of the selected decoding mode, and may further include an index of a code block.

After receiving the determining result from the state determining module 1030, if determining that for a specific code block, a decoding mode used by a corresponding decoding submodule is different from the decoding mode selected by the state determining module 1030, an output processing module 1040 updates a decoding result of the code block based on the decoding mode selected by the state determining module 1030. For example, for block 1, if the decoding mode selected by the state determining module 1030 is the decoding mode corresponding to RX_D, because the decoding mode is the same as the decoding mode used by the decoding submodule 1 for block 1, the output processing submodule 1 does not need to update a decoding result of block 1. For another example, for block 1, if the decoding mode selected by the state determining module 1030 is the decoding mode corresponding to RX_E (in other words, a decoding mode used in an error state), because the decoding mode is different from the decoding mode used by the decoding submodule 1 for block 1, the output processing submodule 1 updates the decoding result of block 1 based on the decoding mode corresponding to RX_E, in other words, updates all eight bytes of XGMII/XXVGMII RXD<63:0> corresponding to block 1 to an error control character /E/. For still another example, for block 5, if the decoding mode selected by the state determining module 1030 is a decoding mode corresponding to RX_LI (in other words, a decoding mode used in a low-power state), because the decoding mode is different from the decoding mode used by the decoding submodule 1 for block 1, an output processing submodule 5 updates the decoding result of block 1 based on the decoding mode corresponding to RX_LI, in other words, updates all the eight bytes of XGMII/XXVGMII RXD<63:0> corresponding to block 1 to a low-power control character /LI/. The output processing module 1040 generates corresponding 64-bit XGMII/XXVGMII interface data and 8-bit XGMII/XXVGMII interface control information based on a decoding result of N code blocks, and outputs the corresponding 64-bit XGMII/XXVGMII interface data and 8-bit XGMII/XXVGMII interface control information to an XGMII/XXVGMII interface.

The decoder 1000 provided in this embodiment of this application may be used in a time division architecture, or may be used in a space division architecture.

In an example space division architecture. N to-be-decoded code blocks are input to the type detection module 1010 in a same clock cycle. The type detection module 1010 detects a type of the N to-be-decoded code blocks in the same clock cycle, and a type detection result of the N to-be-decoded code blocks is input to a decoding and prediction module 1020 in the same clock cycle. The decoding and prediction module 1020 decodes the N to-be-decoded code blocks and performs a decoding mode prediction operation in the same clock cycle. A predicted decoding mode and the type detection result of the N to-be-decoded code blocks are input to the state determining module 1030 in the same clock cycle. Because the state determining module 1030 can obtain the predicted decoding mode and the type detection result of the N to-be-decoded code blocks in the one clock cycle, a decoding mode may be selected from a predicted decoding mode of a corresponding code block in the one clock cycle.

64b/66b encoding is used as an example. FIG. 11 shows the decoder structure applicable to the 64b/66b encoding and the schematic diagram of an input and an output. The state determining module 1030 receives, in the one clock cycle, types of N 66-bit blocks (block 0 to block N−1) that are output by N type detection submodules, and receives predicted decoding modes of block 0 to block N−1. The state determining module 1030 separately selects, in the one clock cycle, a decoding type from predicted decoding types of block (to block N−1 based on outputs of the N type detection submodules and outputs of N prediction submodules.

In an example time division architecture, the N to-be-decoded code blocks are sequentially input to the type detection module 1010 based on a clock cycle. The type detection module 1010 performs type detection on a received to-be-decoded code block, and a type detection result of the N to-be-decoded code blocks is sequentially input to the decoding and prediction module 1020 based on the clock cycle. The decoding and prediction module 1020 sequentially performs a decoding operation and a decoding mode prediction operation on the to-be-decoded code blocks. The predicted decoding mode and the type detection result of the N to-be-decoded code blocks are sequentially input to the state determining module 1030 based on the clock cycle. Because the state determining module 1030 cannot obtain the type detection result and the predicted decoding mode of all the N to-be-decoded code blocks in the one clock cycle, the state determining module 1030 may first cache a received type predicting result and a predicted decoding mode of the to-be-decoded code block, and after obtaining the type detection result and the predicted decoding mode of the N to-be-decoded code blocks, select the decoding mode from the predicted decoding mode of the corresponding code block.

64b/66b encoding is used as an example. FIG. 11 shows the decoder structure applicable to the 64b/66b encoding and the schematic diagram of an input and an output. The state determining module 1030 sequentially receives, in a clock cycle 0 to a clock cycle N−1, the types of the N 66-bit blocks (block 0 to block N−1) that are output by the N type detection submodules, and receives a predicted decoding mode of each code block that is output by the N prediction submodules. The state determining module 1030 caches received type detection results and predicted decoding modes, and after obtaining the type predicting results and the predicted decoding modes of the N code blocks, separately selects one of the predicted decoding modes of block 0 to block N−1.

It may be understood that, when a delay device is disposed only at any two of a first location, a second location, and a third location, or when the delay device is disposed only at any one of the first location, the second location, and the third location, a corresponding decoder structure may be deduced by referring to the decoding principle shown in FIG. 9 and the decoder structure shown in FIG. 10. Details are not separately described in this embodiment of this application.

Herein, although the delay device is disposed at the foregoing three locations, it may be understood that in a decoder provided in some other embodiments, the delay device may be disposed at any two or any one of the foregoing first location, second location, and third location, and functions of the foregoing modules are not affected.

FIG. 12 is a schematic flowchart of a decoding method according to an embodiment of this application. A procedure may be implemented by using the foregoing decoder. Optionally, the foregoing procedure may be applied to decoding a 64b/66b-encoded code block. As shown in the figure, the procedure may include the following steps.

S1200: Detect a type of N to-be-decoded code blocks, where N is an integer greater than or equal to 1.

Optionally, an operation of detecting the type of the N to-be-decoded code blocks is performed in parallel.

S1202: Decode the N to-be-decoded code blocks based on the type of the N to-be-decoded code blocks, to obtain a decoding result of the N to-be-decoded code blocks; and obtain a predicted decoding mode of at least one code block of the N to-be-decoded code blocks.

Optionally, an operation of decoding the N to-be-decoded code blocks based on the type of the N to-be-decoded code blocks is performed in parallel, and an operation of obtaining the predicted decoding mode of the at least one code block of the N to-be-decoded code blocks is performed in parallel.

S1204: Select a decoding mode from a predicted decoding mode of each of the at least one code block.

In some embodiments, an operation in S1200 may be completed in a same clock cycle, and an operation in S1202 may be completed in the same clock cycle. In this way, in S1204, a type and a predicted decoding mode of each code block may be obtained in the same clock cycle, so that an operation in S1204 may be completed in the clock cycle. The method may be applied to a space division architecture.

In some other embodiments, in S1200, type detection is sequentially performed on the N to-be-decoded code blocks based on the clock cycle. For example, type detection is performed on block 0 in a first clock cycle, type detection is performed on block 1 in a second clock cycle, and so on. Correspondingly, type detection results of all code blocks are sequentially output based on the clock cycle. In S1202, a decoding operation and a decoding mode prediction operation are sequentially performed on each code block, and decoding results and prediction results are sequentially output. In S1204, a received predicted decoding mode of each code block and the type of the N to-be-decoded code blocks may be first cached, and then after the type of the N blocks and the predicted decoding mode are obtained through caching, a decoding mode is selected from a predicted decoding mode of a corresponding to-be-decoded code block based on cached information. The method may be applied to a time division architecture.

S1206: Update the decoding result based on the decoding mode, to obtain and output media independent interface information corresponding to the N to-be-decoded code blocks.

For ease of description, any one of the N to-be-decoded code blocks is referred to as a first to-be-decoded code block. Optionally, in S1206, if a decoding mode selected from a predicted decoding mode of the first to-be-decoded code block is a decoding mode used in an error state, a decoding result of the first to-be-decoded code block is updated to error code. Alternatively, if the decoding mode selected from the predicted code block mode of the first to-be-decoded code block is a decoding mode used in a low-power state, the decoding result of the first to-be-decoded code block is updated to low-power control code. Alternatively, if the decoding mode selected from the predicted decoding mode of the first to-be-decoded code block is the same as the decoding mode used for the first to-be-decoded code block in S1202, the decoding result of the first to-be-decoded code block does not need to be updated.

The foregoing procedure further includes at least one of the following operations.

S1201: Delay outputting the type of the N decoded code blocks (that is, a processing result of S1200) by at least one clock cycle.

S1203: Delay outputting the predicted decoding mode and the decoding result of the N to-be-decoded code blocks (that is, a processing result of S1202) by the at least one clock cycle.

S1205: Delay outputting, by the at least one clock cycle, the decoding mode (that is, a processing result of S1204) selected from the predicted decoding mode of each of the at least one code block.

It should be noted that, for an exemplary implementation of the foregoing decoding procedure, refer to related descriptions in the foregoing decoder embodiment.

The foregoing decoding principle provided in this embodiment of this application may also be applied to an encoding process. To be specific, an encoding operation of a physical coding sublayer is split to be performed in two or more clock cycles, to enable different bus bit widths or different processes to have compatible requirements on a time sequence of implementing encoding at the physical coding sublayer, and improve system compatibility and flexibility.

Based on a same technical concept, an embodiment of this application further provides an electronic device. The electronic device may have a structure shown in FIG. 13. The electronic device has a computing capability, and can implement a method procedure provided in embodiments of this application.

Figure 13:
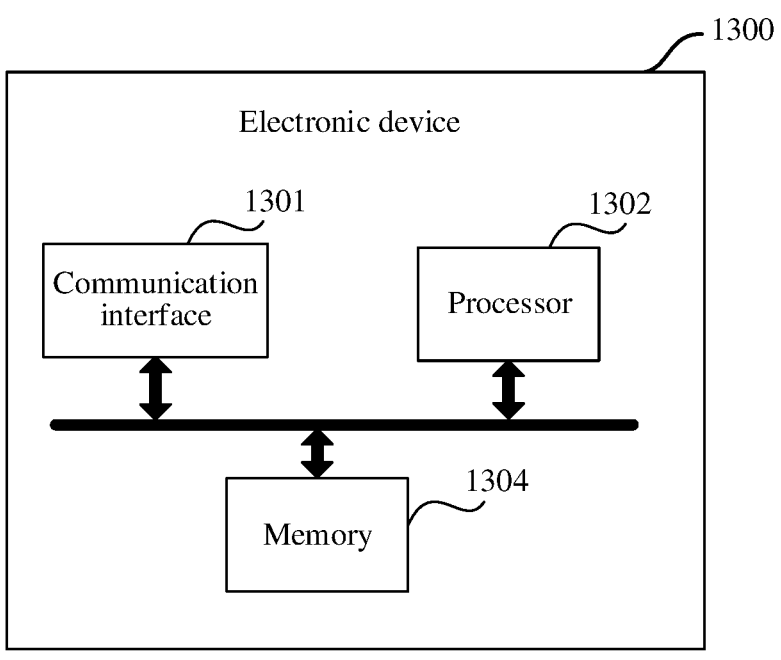
FIG. 13 is a schematic structural diagram of an electronic device according to an embodiment of this application.

An electronic device 1300 shown in FIG. 13 may include at least one processor 1302. The at least one processor 1302 is configured to be coupled to a memory, and read and execute instructions in the memory, to implement steps related to a server in the method provided in embodiments of this application. Optionally, the electronic device may further include a communication interface 1301, configured to support the electronic device in receiving or sending a signaling or data. The communication interface 1301 in the electronic device may be configured to implement interaction with another electronic device. The processor 1302 may be used by the electronic device to perform the steps in the method shown in FIG. 12. Optionally, the electronic device may further include a memory 1304. The memory 1304 stores a computer program and instructions. The memory 1304 may be coupled to the processor 1302 and/or the communication interface 1301, to support the processor 1302 in invoking the computer program and the instructions in the memory 1304 to implement the steps involved in the method provided in embodiments of this application. In addition, the memory 1304 may be further configured to store data involved in method embodiments of this application. For example, the memory 1304 is configured to store data and instructions that are required for supporting the communication interface 1301 in interaction, and/or configured to store configuration information required for the electronic device to perform the method in embodiments of this application.

Based on a same concept as the foregoing method embodiments, an embodiment of this application further provides a computer-readable storage medium. The computer-readable storage medium stores some instructions. When the instructions are invoked and executed by a computer, the computer is enabled to perform the method in the foregoing method embodiments and any possible design of the foregoing method embodiments. In this embodiment of this application, the computer-readable storage medium is not limited. For example, the computer-readable storage medium may be a random access memory (RAM) or a read-only memory (ROM).

Based on the same concept as the foregoing method embodiments, this application further provides a computer program product. When being invoked and executed by a computer, the computer program product can perform the method in any one of the foregoing method embodiments and the possible designs of the foregoing method embodiments.

Based on the same concept as the foregoing method embodiments, this application further provides a chip. The chip may include a processor and an interface circuit, to complete the method in any one of the foregoing method embodiments and the possible implementations of the foregoing method embodiments. "Coupling" means that two components are directly or indirectly combined with each other. The combination may be fixed or movable, and the combination may allow communication of fluid, electricity, an electrical signal, or another type of signal between two components.

It may be understood that the processor in embodiments of this application may be a central processing unit (CPU), or may be another general purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in a base station or a terminal. Certainly, the processor and the storage medium may alternatively exist in the base station or the terminal as discrete components.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs and instructions. When the computer programs or the instructions are loaded and executed on a computer, all or some of the procedures or functions in embodiments of this application are executed. The computer may be a general-purpose computer, a special-purpose computer, a computer network, a base station, user equipment, or another programmable apparatus. The computer programs or the instructions may be stored in a computer-readable storage medium, or may be transmitted from the computer-readable storage medium to another computer-readable storage medium. For example, the computer programs or the instructions may be transmitted from a website, computer, server, or data center to another website, computer, server, or data center in a wired manner or in a wireless manner. The computer-readable storage medium may be any usable medium that can be accessed by the computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive. The computer-readable storage medium may be a volatile or non-volatile storage medium, or may include two types of storage media; the volatile storage medium and the non-volatile storage medium.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application. "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A decoder, wherein the decoder comprises: a type detector, configured to detect a type of N to-be-decoded code blocks, wherein the N to-be-decoded code blocks are arranged in sequence, and N is an integer greater than or equal to 1;

a decoding and predicting circuit, configured to: decode the N to-be-decoded code blocks based on the type of the N to-be-decoded code blocks, to obtain a decoding result of the N to-be-decoded code blocks; and obtain a predicted decoding mode of at least one code block of the N to-be-decoded code blocks by predicting, for a next to-be-decoded code block of a current to-be-decoded code block, possible decoding modes of the next to-be-decoded code block;

a state determiner, configured to select a decoding mode from a predicted decoding mode of each of the at least one code block; and

an output processor, configured to update the decoding result based on the decoding mode, to obtain and output media independent interface information corresponding to the N to-be-decoded code blocks, wherein the decoder further comprises a delay circuit, configured to delay outputting received data by at least one clock cycle, wherein the type detector sends the type of the N to-be-decoded code blocks to the decoding and predicting circuit via the delay circuit;

the decoding and predicting circuit sends the predicted decoding mode to the state determiner and the decoding result of the N to-be-decoded code blocks to the output processor via the delay circuit; or the state determiner sends the decoding mode to the output processor via the delay circuit.

2. The decoder according to claim 1, wherein the state determiner is configured to:

select a decoding mode from a predicted decoding mode of a first to-be-decoded code block based on a type of the first to-be-decoded code block and a type of a next code block of the first to-be-decoded code block, wherein the first to-be-decoded code block is any one of the at least one code block.

3. The decoder according to claim 2, wherein the output processor is configured to:

in response to a decoding mode used by the decoding and predicting circuit for the first to-be-decoded code block being different from the decoding mode selected by the state determiner from the predicted decoding mode of the first to-be-decoded code block, update a decoding result of the first to-be-decoded code block based on the decoding mode selected by the state determiner from the predicted decoding mode of the first to-be-decoded code block, wherein the first to-be-decoded code block is any one of the at least one code block.

4. The decoder according to claim 2, wherein the output processor is configured to:

in response to the decoding mode selected from the predicted decoding mode of the first to-be-decoded code block being a decoding mode used in an error state, update a decoding result of the first to-be-decoded code block to an error code, wherein the first to-be-decoded code block is any one of the at least one code block.

5. The decoder according to claim 2, wherein the output processor is configured to:

in response to the decoding mode selected from the predicted decoding mode of the first to-be-decoded code block being a decoding mode used in a low-power state, update a decoding result of the first to-be-decoded code block to a low-power control code, wherein the first to-be-decoded code block is any one of the at least one code block.

6. The decoder according to claim 1, wherein the type detector comprises N type subdetectors, and the N type subdetectors are in a one-to-one correspondence with the N to-be-decoded code blocks;

the decoding and predicting circuit comprises N decoding subcircuits and N predicting subcircuits, the N decoding subcircuits are in a one-to-one correspondence with the N to-be-decoded code blocks, and the N predicting subcircuits are in a one-to-one correspondence with the N to-be-decoded code blocks; and the output processor comprises N output subprocessors, and the N output subprocessors are in a one-to-one correspondence with the N to-be-decoded code blocks.

7. The decoder according to claim 6, wherein the N type subdetectors run in parallel, the N decoding subcircuits run in parallel, the N predicting subcircuits run in parallel, and the N output subprocessors run in parallel.

8. The decoder according to claim 1, wherein the to-be-decoded code block is a 66-bit block descrambled by a physical coding sublayer (PCS), the 66-bit block comprises a 2-bit synchronization header and a 64-bit payload, the 64-bit payload comprises 8-bit block type information and 56-bit data, and the media independent interface information comprises 64-bit 10 Gigabit Media Independent Interface (XGMII)/25 Gigabit Media Independent Interface (XXVGMII) interface data and 8-bit XGMII/XXVGMII interface control information.

9. A decoding method, wherein the method comprises:
detecting a type of N to-be-decoded code blocks, wherein N is an integer greater than or equal to 1;

decoding the N to-be-decoded code blocks based on the type of the N to-be-decoded code blocks, to obtain a decoding result of the N to-be-decoded code blocks; and obtaining a predicted decoding mode of at least one code block of the N to-be-decoded code blocks by predicting, for a next to-be-decoded code block of a current to-be-decoded code block, possible decoding modes of the next to-be-decoded block;

selecting a decoding mode from a predicted decoding mode of each of the at least one code block; and updating the decoding result based on the decoding mode, to obtain and output media independent interface information corresponding to the N to-be-decoded code blocks, wherein the method further comprises at least one of the following operations:

delaying outputting the type of the N to-be-decoded code blocks by at least one clock cycle;

delaying outputting the predicted decoding mode and the decoding result of the N to-be-decoded code blocks by the at least one clock cycle; and delaying outputting, by the at least one clock cycle, the decoding mode selected from the predicted decoding mode of each of the at least one code block.

10. The method according to claim 9, wherein the obtaining the predicted decoding mode of the at least one code block of the N to-be-decoded code blocks comprises:

selecting a decoding mode from a predicted decoding mode of a first to-be-decoded code block based on a type of the first to-be-decoded code block and a type of a next code block of the first to-be-decoded code block, wherein the first to-be-decoded code block is any one of the at least one code block.

11. The method according to claim 10, wherein the updating the decoding result based on the decoding mode selected from the predicted decoding mode of each of the at least one code block comprises:

in response to a decoding mode used by a decoding and predicting circuit for the first to-be-decoded code block being different from the decoding mode selected by a state determiner from the predicted decoding mode of the first to-be-decoded code block, updating a decoding result of the first to-be-decoded code block based on the decoding mode selected by the state determiner from the predicted decoding mode of the first to-be-decoded code block, wherein the first to-be-decoded code block is any one of the at least one code block.

12. The method according to claim 10, wherein updating the decoding result based on the decoding mode selected from the predicted decoding mode of each of a part of the code blocks comprises:

in response to the decoding mode selected from the predicted decoding mode of the first to-be-decoded code block being a decoding mode used in an error state, updating a decoding result of the first to-be-decoded code block to an error code, wherein the first to-be-decoded code block is any one of the at least one code block.

13. The method according to claim 10, wherein updating the decoding result based on the decoding mode selected from the predicted decoding mode of each of a part of the code blocks comprises:

in response to the decoding mode selected from the predicted decoding mode of the first to-be-decoded code block being a decoding mode used in a low-power state, updating a decoding result of the first to-be-decoded code block to a low-power control code, wherein the first to-be-decoded code block is any one of the at least one code block.

14. The method according to claim 9, wherein the to-be-decoded code block is a 66-bit block descrambled by a physical coding sublayer (PCS), the 66-bit block comprises a 2-bit synchronization header and a 64-bit payload, the 64-bit payload comprises 8-bit block type information and 56-bit data, and the media independent interface information comprises 64-bit 10 Gigabit Media Independent Interface (XGMII)/25 Gigabit Media Independent Interface (XXVG-MII) interface data and 8-bit XGMII/XXVGMII interface control information.

15. An electronic device, wherein the electronic device comprises one or more processors and one or more memories, the one or more memories store one or more computer programs, the one or more computer programs comprise instructions, and when the instructions are executed by the one or more processors, cause the electronic device to perform:

detecting a type of N to-be-decoded code blocks, wherein N is an integer greater than or equal to 1;

decoding the N to-be-decoded code blocks based on the type of the N to-be-decoded code blocks, to obtain a decoding result of the N to-be-decoded code blocks; and obtaining a predicted decoding mode of at least one code block of the N to-be-decoded code blocks by predicting, for a next to-be-decoded code block of a current to-be-decoded code block, possible decoding modes of the next to-be-decoded block;

selecting a decoding mode from a predicted decoding mode of each of the at least one code block; and updating the decoding result based on the decoding mode, to obtain and output media independent interface information corresponding to the N to-be-decoded code blocks, wherein the electronic device is further caused to perform at least one of the following operations:

delaying outputting the type of the N to-be-decoded code blocks by at least one clock cycle;

delaying outputting the predicted decoding mode and the decoding result of the N to-be-decoded code blocks by the at least one clock cycle; and delaying outputting, by the at least one clock cycle, the decoding mode selected from the predicted decoding mode of each of the at least one code block.

16. The electronic device according to claim 15, wherein the obtaining the predicted decoding mode of the at least one code block of the N to-be-decoded code blocks comprises the electronic device is caused to perform:

selecting a decoding mode from a predicted decoding mode of a first to-be-decoded code block based on a type of the first to-be-decoded code block and a type of a next code block of the first to-be-decoded code block, wherein the first to-be-decoded code block is any one of the at least one code block.

17. The electronic device according to claim 16, wherein the updating the decoding result based on the decoding mode selected from the predicted decoding mode of each of the at least one code block comprises the electronic device is caused to perform:

in response to a decoding mode used by a decoding and predicting circuit for the first to-be-decoded code block being different from the decoding mode selected by a state determiner from the predicted decoding mode of the first to-be-decoded code block, updating a decoding result of the first to-be-decoded code block based on the decoding mode selected by the state determiner from the predicted decoding mode of the first to-be-decoded code block, wherein the first to-be-decoded code block is any one of the at least one code block.

18. The electronic device according to claim 16, wherein updating the decoding result based on the decoding mode selected from the predicted decoding mode of each of a part of the code blocks comprises the electronic device is caused to perform:

in response to the decoding mode selected from the predicted decoding mode of the first to-be-decoded code block being a decoding mode used in an error state, updating a decoding result of the first to-be-decoded code block to an error code, wherein the first to-be-decoded code block is any one of the at least one code block.

19. The electronic device according to claim 16, wherein updating the decoding result based on the decoding mode selected from the predicted decoding mode of each of a part of the code blocks comprises the electronic device is caused to perform:

in response to the decoding mode selected from the predicted decoding mode of the first to-be-decoded code block being a decoding mode used in a low-power state, updating a decoding result of the first to-be-decoded code block to a low-power control code, wherein the first to-be-decoded code block is any one of the at least one code block.

20. The electronic device according to claim 15, wherein the to-be-decoded code block is a 66-bit block descrambled by a physical coding sublayer (PCS), the 66-bit block comprises a 2-bit synchronization header and a 64-bit payload, the 64-bit payload comprises 8-bit block type information and 56-bit data, and the media independent interface information comprises 64-bit 10 Gigabit Media Independent Interface (XGMII)/25 Gigabit Media Independent Interface (XXVGMII) interface data and 8-bit XGMII/XXVGMII interface control information.

* * * * *